US012646523B2

(12) United States Patent
Mahajan et al.

(10) Patent No.: US 12,646,523 B2
(45) Date of Patent: Jun. 2, 2026

(54) SYSTEM AND METHOD FOR ADAPTIVE AUDIO SEGMENTATION FOR CONTEXTUAL SPEECH SIGNAL PROCESSING

(71) Applicant: Bank of America Corporation, Charlotte, NC (US)

(72) Inventors: Nipun Mahajan, Lawrenceville, NJ (US); Amit Mishra, Tamil Nadu (IN); Mohammed Zubair M, Tamil Nadu (IN); S. B. Pravin Kumar, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 169 days.

(21) Appl. No.: 18/749,766

(22) Filed: Jun. 21, 2024

(65) Prior Publication Data

US 2025/0391420 A1     Dec. 25, 2025

(51) Int. Cl.
*G10L 21/0216* (2013.01)
*G10L 15/20* (2006.01)
*G10L 25/30* (2013.01)

(52) U.S. Cl.
CPC .......... *G10L 21/0216* (2013.01); *G10L 15/20* (2013.01); *G10L 25/30* (2013.01)

(58) Field of Classification Search
CPC ...... G10L 21/0216; G10L 15/20; G10L 25/30
USPC ....................................................... 704/226
See application file for complete search history.

(56) References Cited

U.S. PATENT DOCUMENTS

| | | | | |
|---|---|---|---|---|
| 9,837,102 B2 * | 12/2017 | Zad Issa | ................. | G10L 25/84 |
| 10,438,354 B2 * | 10/2019 | Hsieh | .................... | G06T 7/0012 |
| 11,003,988 B2 * | 5/2021 | Hsieh | ...................... | G06F 30/27 |
| 11,076,451 B2 * | 7/2021 | Dahan | ............... | H04W 72/0453 |
| 11,088,947 B2 * | 8/2021 | Altman | ................. | H04L 41/145 |

(Continued)

FOREIGN PATENT DOCUMENTS

| | | | | | |
|---|---|---|---|---|---|
| CN | 1737906 A | * | 2/2006 | ......... | G10L 21/0272 |
| CN | 105023580 A | * | 11/2015 | | |

(Continued)

OTHER PUBLICATIONS

Nipun Mahajan, et al., U.S. Appl. No. 18/749,733, filed Jun. 21, 2024, "System and method for contextual analysis and metadata database generation for user-specific speech patterns.".

(Continued)

*Primary Examiner* — Edwin S Leland, III

(57) ABSTRACT

A system for audio segmentation for context change detection in speech is disclosed. The system accesses a speech signal of a user and identifies the user based on the voice print associated with the user. The system detects a potential context change between a first audio frame and a second audio frame of the speech signal. The system splits the speech signal into a first set of split audio frames based on the potential context change. The system generates a noisy speech signal by modulating a flicker noise signal into the speech signal. The system splits the noisy speech signal into a second set of split audio frames. The system detects a difference between the first and second sets of split audio frames. The system reconfigures a modulation of the speech signal with the flicker noise signal to reduce the difference between the first and second sets of audio frames.

20 Claims, 7 Drawing Sheets

(56)                References Cited

U.S. PATENT DOCUMENTS

| | | | | |
|---|---|---|---|---|
| 11,304,203 | B2 * | 4/2022 | Yang | H04W 28/24 |
| 11,310,104 | B2 * | 4/2022 | Stockert | G06N 3/092 |
| 11,374,779 | B2 * | 6/2022 | Sanders | H04L 67/56 |
| 11,423,254 | B2 * | 8/2022 | Prakash | G06F 15/16 |
| 11,736,973 | B2 * | 8/2023 | Alkurd | H04L 41/40 |
| | | | | 370/329 |
| 11,822,825 | B2 * | 11/2023 | Neelakantam | G06F 3/064 |
| 11,863,328 | B2 * | 1/2024 | Zhu | H04L 1/1874 |
| 2012/0053931 | A1 * | 3/2012 | Holzrichter | H04R 3/002 |
| | | | | 704/E19.001 |
| 2014/0006017 | A1 * | 1/2014 | Sen | H04S 7/30 |
| | | | | 704/226 |
| 2020/0034948 | A1 * | 1/2020 | Park | G06T 5/70 |
| 2020/0311559 | A1 * | 10/2020 | Chattopadhyay | G06N 5/01 |
| 2022/0014963 | A1 * | 1/2022 | Yeh | H04W 28/0268 |
| 2022/0109622 | A1 * | 4/2022 | Yeh | H04L 67/10 |
| 2022/0124009 | A1 * | 4/2022 | Metsch | G06F 21/577 |
| 2022/0124543 | A1 * | 4/2022 | Orhan | H04W 28/021 |
| 2022/0124560 | A1 * | 4/2022 | Yeh | H04W 28/18 |
| 2022/0141026 | A1 * | 5/2022 | Smith | H04L 9/3263 |
| | | | | 713/181 |
| 2023/0209283 | A1 * | 6/2023 | Wagner | H04R 25/606 |
| | | | | 381/312 |
| 2023/0221692 | A1 * | 7/2023 | Cella | G05B 19/042 |
| | | | | 700/295 |
| 2025/0391404 | A1 * | 12/2025 | Mahajan | G10L 15/20 |
| 2025/0391420 | A1 * | 12/2025 | Mahajan | G10L 21/0216 |
| 2025/0391421 | A1 * | 12/2025 | Mahajan | G10L 21/0272 |

FOREIGN PATENT DOCUMENTS

| | | | | | |
|---|---|---|---|---|---|
| CN | 117437937 | A | * | 1/2024 | G10L 25/51 |
| CN | 110390957 | B | * | 7/2024 | G10L 25/21 |
| CN | 120472886 | A | * | 8/2025 | |
| EP | 3164871 | B1 | * | 11/2017 | G10L 25/84 |
| WO | WO-2007043679 | A1 | * | 4/2007 | G06F 16/40 |
| WO | WO-2016183662 | A1 | * | 11/2016 | H04S 7/305 |

OTHER PUBLICATIONS

Nipun Mahajan, et al., U.S. Appl. No. 18/749,817, filed Jun. 21, 2024, "System and method for dynamic audio slicing window selection based on context and speech patterns.".

* cited by examiner

300

500

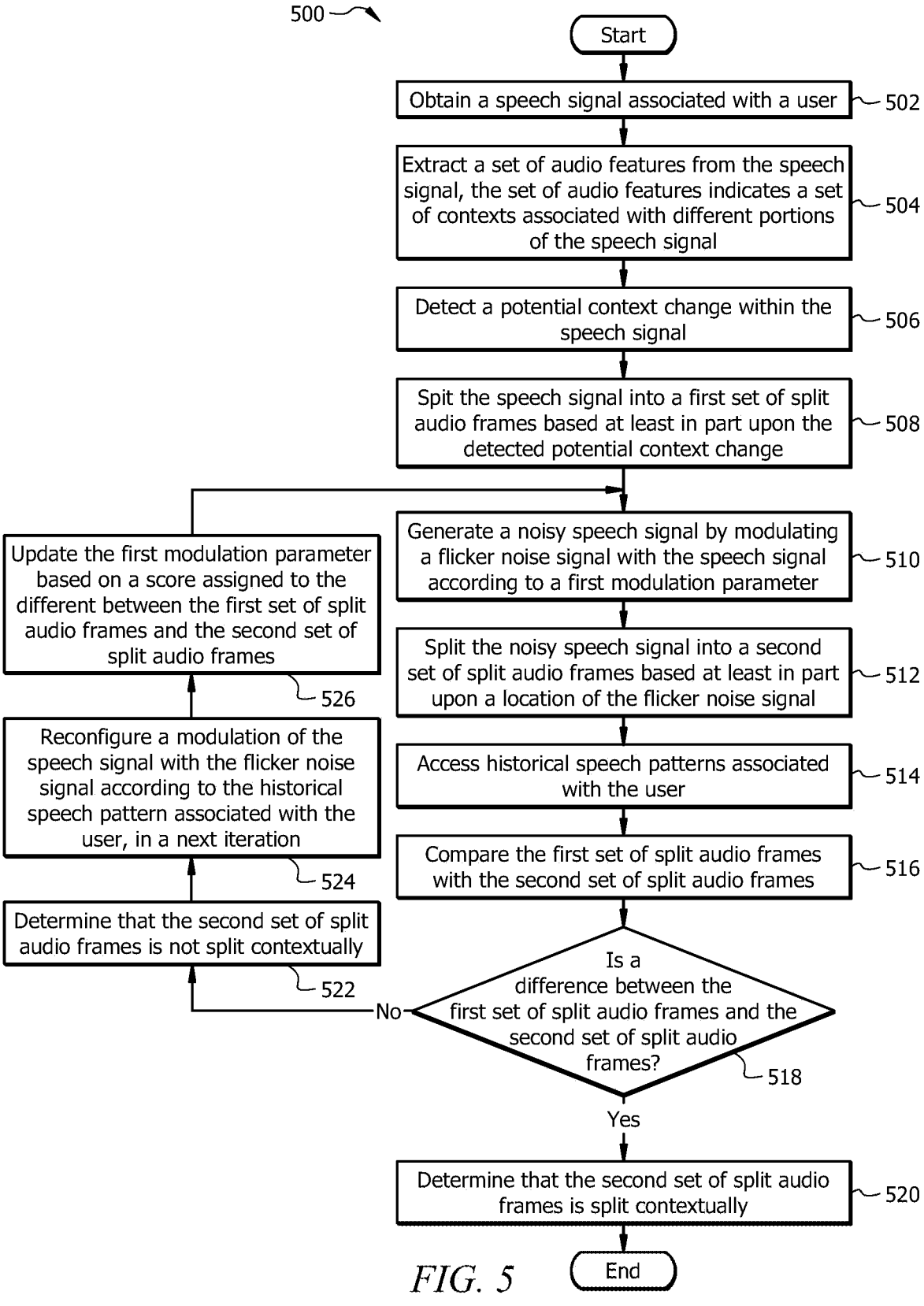

Start

Obtain a speech signal associated with a user ~ 502

Extract a set of audio features from the speech signal, the set of audio features indicates a set of contexts associated with different portions of the speech signal ~ 504

Detect a potential context change within the speech signal ~ 506

Spit the speech signal into a first set of split audio frames based at least in part upon the detected potential context change ~ 508

Generate a noisy speech signal by modulating a flicker noise signal with the speech signal according to a first modulation parameter ~ 510

Split the noisy speech signal into a second set of split audio frames based at least in part upon a location of the flicker noise signal ~ 512

Access historical speech patterns associated with the user ~ 514

Compare the first set of split audio frames with the second set of split audio frames ~ 516

Is a difference between the first set of split audio frames and the second set of split audio frames? ~ 518

No

Determine that the second set of split audio frames is not split contextually ~ 522

Reconfigure a modulation of the speech signal with the flicker noise signal according to the historical speech pattern associated with the user, in a next iteration ~ 524

Update the first modulation parameter based on a score assigned to the different between the first set of split audio frames and the second set of split audio frames ~ 526

Yes

Determine that the second set of split audio frames is split contextually ~ 520

End

*FIG. 5*

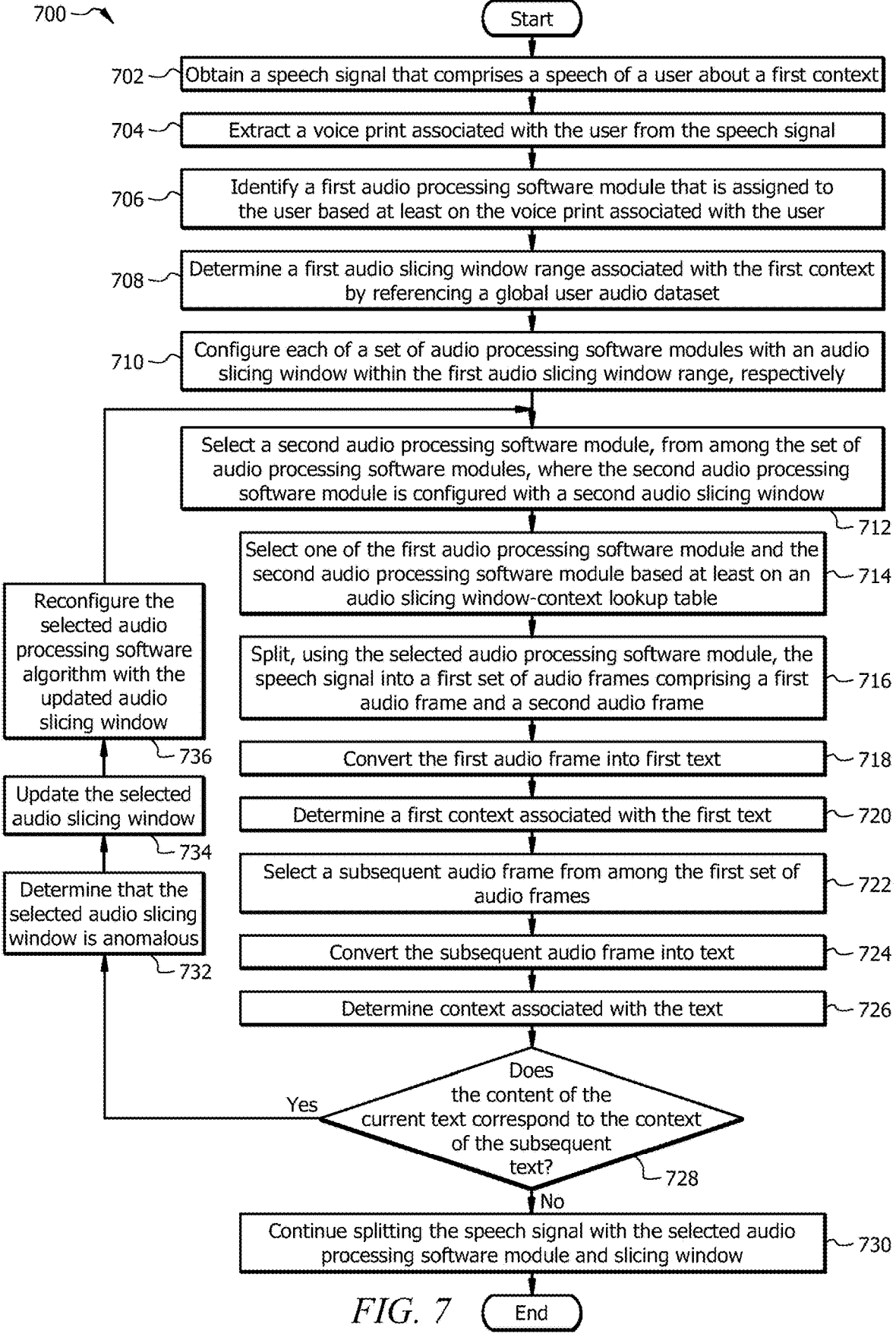

700

Start

702 — Obtain a speech signal that comprises a speech of a user about a first context 704 — Extract a voice print associated with the user from the speech signal 706 — Identify a first audio processing software module that is assigned to the user based at least on the voice print associated with the user 708 — Determine a first audio slicing window range associated with the first context by referencing a global user audio dataset 710 — Configure each of a set of audio processing software modules with an audio slicing window within the first audio slicing window range, respectively Select a second audio processing software module, from among the set of audio processing software modules, where the second audio processing software module is configured with a second audio slicing window
712

Select one of the first audio processing software module and the second audio processing software module based at least on an audio slicing window-context lookup table
714

Split, using the selected audio processing software module, the speech signal into a first set of audio frames comprising a first audio frame and a second audio frame
716

Reconfigure the selected audio processing software algorithm with the updated audio slicing window
736

Update the selected audio slicing window
734

Determine that the selected audio slicing window is anomalous
732

Convert the first audio frame into first text
718

Determine a first context associated with the first text
720

Select a subsequent audio frame from among the first set of audio frames
722

Convert the subsequent audio frame into text
724

Determine context associated with the text
726

Does the content of the current text correspond to the context of the subsequent text?
728

Yes

No

Continue splitting the speech signal with the selected audio processing software module and slicing window
730

FIG. 7

End

SYSTEM AND METHOD FOR ADAPTIVE AUDIO SEGMENTATION FOR CONTEXTUAL SPEECH SIGNAL PROCESSING

TECHNICAL FIELD

The present disclosure relates generally to speech recognition, and more specifically to a system and method for adaptive audio segmentation for contextual speech signal processing.

BACKGROUND

Users communicate with organizations to request a service or product. For example, a user may initiate a phone call with an organization to request a service provided by the organization. Organizations use speech recognition techniques to interpret the users' speech and provide a response to users.

SUMMARY

The disclosed system, described in the present disclosure, is particularly integrated into a practical application of improving speech interpretation technology. This practical application provides several technical advantages, including more accurately interpreting a speech signal, detecting a more accurate query indicated in the speech signal (e.g., by a user), and generating a more accurate response (in the form of text and/or audio) that addresses the detected query. For example, the disclosed system improves the speech interpretation technology by contextually splitting the speech signal into audio frames whenever a context change is detected within the speech signal. The disclosed system uses the contextually-split audio frames for interpreting the speech signal, detecting a query uttered in the speech signal, and generating a response to address the query. By splitting the speech signal into contextually-split audio frames, the words that are related to the same context/topic are not separated into different audio frames, and this leads to interpreting the words related to the same context/topic together, which leads to a more accurate interpretation.

In the current systems, audio slicing is static-meaning that the audio slicing duration is statically set in terms of the number of words, number of sentences, or a predefined duration. However, this static audio slicing approach leads to sentences or words, related to the same context/topic, being separated into different audio segments. This leads to inaccuracies in analysis and understanding of the overall meaning and intent of the speech signal, reduced effectiveness in speech recognition algorithms, sentiment analysis, and misinterpretations of the speech signal when the audio frames are processed independently of their full context.

Furthermore, the speech pattern of each user may differ from other people. Thus, the static audio slicing fails to account for individual variations in speech patterns, such as rate, pause, intonations, etc. The lack of personalized dynamic audio slicing and processing leads to discrepancies in the interpretation of each user's speech. This is more evident in user-specific applications, such as personalized voice assistant analytics, user-specific conversation software algorithms/agents, and the like.

The disclosed system provides technical solutions to these and other technical problems in the realm of speech recognition and interpretation. In some embodiments, the disclosed system is configured to dynamically split a speech signal into a set of audio frames whenever a context change is detected based on the historical audio recordings of conversations between the user and other people when the user has communicated with entities at the organization. For example, the disclosed system determines the context of each word and generates a context vector for each word uttered in the speech signal. The disclosed system also detects flicker noise signals within the speech signal. In some cases, when a flicker noise signal is detected, it may indicate a pause in the speech of the user, where the pause may be due to a context change in the speech signal. Based on the context of each word and the flicker noise signals, the disclosed system may detect dynamic split points during the speech signal, when a context change occurs and splits the speech signal at the detected split points. Thus, the disclosed system provides a dynamic audio segmentation for a more precise interpretation and processing of the speech signal. This leads to generating a more accurate response to the user's query on their communication (e.g., phone call) with the entity associated with the organization.

In some cases, the tone and speech pattern of a user may vary based on their current state of mind, emotion, or urgency level of the situation. In such cases, the current speech processing systems are not able to adapt to variations in the speech of the user that are caused by the current circumstances of the user. The static audio slicing approach fails to capture these variations, and it may lead to inaccurate speech recognition and interpretation. The disclosed system is configured to provide technical solutions to these and other technical problems in the realm of speech signal recognition and interpretation. In some embodiments, the disclosed system is configured to dynamically change the audio slicing window/duration based on the current user's interaction (e.g., call conversation) with an entity at the organization. For example, the disclosed system may increase or decrease the audio slicing window to adapt to the current circumstances of the user and to capture more accurate context changes/transitions during the user's speech signal for interpretation, transcription, and generation of a more accurate response to the user. Further, the disclosed system analyzes the user's speech signal to detect tone, and changes in speed, volume, and pitch that may indicate a change in emotion, urgency, or state of mind of the user. In response, the disclosed system may dynamically change the audio slicing window based on the detected changes. Specifically, during a fast speech burst that may indicate urgency or excitement, the disclosed system may reduce the audio slicing window to capture more granular details in each audio slice. This leads to a more accurate speech recognition and interpretation in cases where there is evidence of a change in emotion or state of mind of the user in the speech signal compared to historical speech recordings of the user, where the intelligence from the historical speech recordings may not include data about the current variation in the user's speech pattern.

The current speech-to-text transcription and speech recognition algorithms face challenges that reduce their accuracy and reliability. For example, the current speech-to-text transcription and speech recognition algorithms suffer from limited bandwidth and inefficiencies of audio codecs which degrade audio quality and consequently transcription accuracy. Additionally, complications in speech transcription arise when multiple audio channels, such as those from a conference call between several speakers, are combined into a single audio stream. This confuses the current transcription systems, as to which is the user of interest, and leads to further inaccuracies since the current systems struggle to isolate individual speakers and comprehend overlapping dialogues.

The disclosed system is configured to provide technical solutions to these and other technical problems in the realm of speech signal recognition and interpretation. In some embodiments, the disclosed system is configured to deploy several audio processing software modules in conjunction with each other, where each audio processing software module is given the same audio stream but is configured with a different audio slicing window and/or captures different frequency ranges from the speech signal. Thus, the disclosed system is able to cross-reference and compare the effect of multiple audio slicing windows on the context change detection and context accuracy across multiple audio slicing windows. For example, the disclosed system uses multiple audio slicing windows to slice a first part of the audio stream (e.g., a first few seconds of the speech signal) and compares the context of each audio frame with a subsequent audio frame per audio slicing window.

In response, the disclosed system selects one of the audio slicing windows, that leads to the contextual splitting of the first part of the audio stream, and uses the selected audio slicing window for the next part of the audio stream. The disclosed system is configured to iteratively perform these operations for each part of the audio stream, one audio frame at a time, until the end of the audio stream. Thus, at every instance, a different, more appropriate audio slicing window may be selected to perform the audio slicing on one or more audio frames on the audio stream. Thus, the disclosed system adapts to the current changes in the user's speech signal to capture more accurate context changes. This leads to a more accurate slicing of the audio stream and speech recognition based on changes in context and other variations in the speech, e.g., background noise, bandwidth fluctuations, tone, pitch, speed, etc. Thus, the disclosed system dynamically adapts the audio slicing window based on feedback on the context change detection and transcription accuracy of the current and one or more preceding audio frames.

The disclosed system is further configured to separate audio streams within the same call, where each speaker is assigned a dedicated audio processing software module that focuses on analyzing their speech. The disclosed system is configured to perform the adaptive audio slicing process per speaker's speech. This reduces the errors and misinterpretations caused by overlapping conversations. The audio processing software modules are configured to dynamically switch between different audio streams to balance context detection and transcription quality against bandwidth requirements. For example, in a bandwidth-constrained environment, the disclosed system may opt for an audio codec that compresses audio to reduce the bandwidth consumption. In another example, in a bandwidth-rich environment, the disclosed system may choose a higher-quality codec to increase speech recognition and transcription accuracy. In another example, more audio processing software modules and resources may be allocated to a conference call with more than two speakers compared to a call with only two speakers. In this manner, the disclosed system reduces errors and inaccuracies in context detection and transcription, improves the quality and accuracy of context detection and transcriptions, and improves the accuracy of responses to users.

Contextual Analysis and Metadata Database Generation for User-Specific Speech Patterns In some embodiments, a system for contextual analysis of a speech signal comprises a memory operably coupled with a processor. The memory is configured to store an audio recording of a conversion between a first user and one or more other users and a word-context dataset, that comprises a set of words associated with a set of contexts, wherein each word from the set of words is associated with a respective context. The processor is configured to extract a voice print associated with the first user from the audio recording, wherein the extracted voice print comprises a tone of speech associated with the first user. The processor is further configured to separate a speech signal associated with the first user from other speech signals associated with the one or more other users based, at least in part, upon the extracted voice print associated with the first user. The processor is further configured to extract a set of frequency features from the speech signal, wherein the extracted set of frequency features comprises a frequency amplitude or bandwidth associated with the speech signal. The processor is further configured to detect one or more flicker noise signals within the speech signal based, at least in part, upon the extracted set of frequency features, wherein a flicker noise signal corresponds to a frequency signal that has an amplitude less than a threshold value. The processor is further configured to split the speech signal into a first set of audio frames, wherein each audio frame comprises an utterance of one or more words. The processor is further configured to convert each of the set of audio frames into a respective text. The processor is further configured to determine the context associated with the respective text by referencing the word-context dataset. The processor is further configured to detect a context change between a first text associated with a first audio frame and a second text associated with a second audio frame based, at least in part, upon differing contexts determined for the first text and the second text. The processor is further configured to generate a contextually split set of audio frames by splitting the speech signal into a second set of audio frames comprising the first audio frame and the second audio frame according to the determined context, associated with the respective text and the detected one or more flicker noise signals.

Adaptive Audio Segmentation for Contextual Speech Signal Processing

In some embodiments, a system for adaptive audio segmentation for context change detection in speech comprises a memory operably coupled with a processor. The memory is configured to store an audio recording of a speech signal associated with a user. The processor is configured to extract, by a context detection machine learning algorithm, a set of audio features from the speech signal, wherein the set of audio features indicates a set of contexts associated with different portions of the speech signal, wherein the set of contexts is extracted based, at least in part, upon a set of historical context data extracted from a set of speeches associated with a set of users. The processor is further configured to detect a potential context change between a first audio frame and a second audio frame within the speech signal based, at least in part, upon the set of contexts, wherein the potential context change is at a split point between the first audio frame and the second audio frame. The processor is further configured to split the speech signal into a first set of split audio frames, wherein the first set of split audio frames is contextually split based, at least in part, upon the detected potential context change. The processor is further configured to generate a noisy speech signal by modulating at least one flicker noise signal with the speech signal, according to a first modulation parameter. The at least one flicker noise signal corresponds to a frequency signal that has a frequency less than a threshold frequency. According to the first modulation parameter, the at least one flicker noise signal is added to a first location along the speech signal in a first iteration. The processor is further configured to split the noisy speech signal into a second set of split audio frames; wherein the second set of split audio frames is split at the first location of the at least one flicker noise signal along the noisy speech signal. The processor is further configured to access a historical speech pattern associated with the user. The processor is further configured to compare the second set of split audio frames with the first set of split audio frames. The processor is further configured to determine that the first set of split audio frames has at least the split point that is missing from the second set of split audio frames based at least in part upon the comparison. The processor is further configured to determine that the second set of split audio frames is not split contextually in response to determining that the second set of split audio frames has at least the split point that is missing from the first set of split audio frames. The processor is further configured to reconfigure, according to the historical speech pattern associated with the user, a modulation of the speech signal with the at least one flicker noise signal, such that the first location of the at least one flicker noise signal along the noisy speech signal is moved toward the split point indicated by the first set of split audio frames.

Dynamic Audio Slicing Window Selection Based on Context and Speech Patterns

In some embodiments, a system for an audio slicing window selection for contextually splitting a speech signal comprises a memory operably coupled with a processor. The memory is configured to store an audio recording of a speech signal associated with a user, a word-context dataset that comprises a set of words, wherein each word from the set of words is associated with a corresponding context, and a global user audio dataset that comprises a first audio slicing window range associated with a first context, wherein the first audio slicing window range is determined based, at least in part, upon historical audio recordings within which the first context is uttered by one or more users. The processor is configured to determine that the first audio slicing window range is associated with the first context by referencing the global user audio dataset. The processor is further configured to configure a first audio processing software algorithm with a first audio slicing window, wherein the first audio slicing window is within the first audio slicing window range. The processor is further configured to extract a voice print associated with the user from the speech signal, wherein the extracted voice print comprises a tone of speech associated with the user. The processor is further configured to identify, based, at least in part, upon the extracted voice print, a second audio processing software algorithm that is assigned to the user. The second audio processing software algorithm is configured to split the speech signal contextually according to a second audio slicing window. The second audio slicing window is set based, at least in part, upon predicted context changes among various portions of the speech signal. The processor is further configured to select one of the first audio processing software algorithm and the second audio processing software algorithm. The processor is further configured to split, using the selected audio processing software algorithm, the speech signal into a first set of audio frames, wherein each audio frame comprises an utterance of one or more words. The processor is further configured to convert a first audio frame from among the first set of audio frames into a first text. The processor is further configured to determine a first context associated with the first text based, at least in part, upon the word-context dataset. The processor is further configured to convert a second audio frame from among the first set of audio frames into a second text. The processor is further configured to determine a second context associated with the second text based, at least in part, upon the word-context dataset. The processor is further configured to compare the first context with the second context. The processor is further configured to determine whether the first context corresponds with the second context. The processor is further configured to determine that a selected audio slicing window is anomalous in response to determining that the first context corresponds with the second context. The processor is further configured to determine that a selected audio slicing window is anomalous. The processor is further configured to update the selected audio slicing window. The processor is further configured to reconfigure the selected audio processing software algorithm with the updated selected audio slicing window. The processor is further configured to perform a context detection operation on the speech signal by taking at least the reconfigured audio processing software algorithm into account.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an example flowchart of a method for adaptive audio segmentation for detecting context changes in speech;

FIG. 7 illustrates an example flowchart of a method for a dynamic audio slicing window selection for contextually splitting a speech signal.

DETAILED DESCRIPTION

As described above, previous technologies fail to provide efficient and reliable solutions to accurately interpret speech signals and to provide responses that address the query indicated in the speech signal. Embodiments of the present disclosure and its advantages may be understood by referring to FIGS. 1 through 7. FIGS. 1 through 7 are used to describe systems and methods to accurately interpret speech signals and to provide responses that address the query indicated in the speech signal, according to some embodiments.

System Overview

Figure 1:
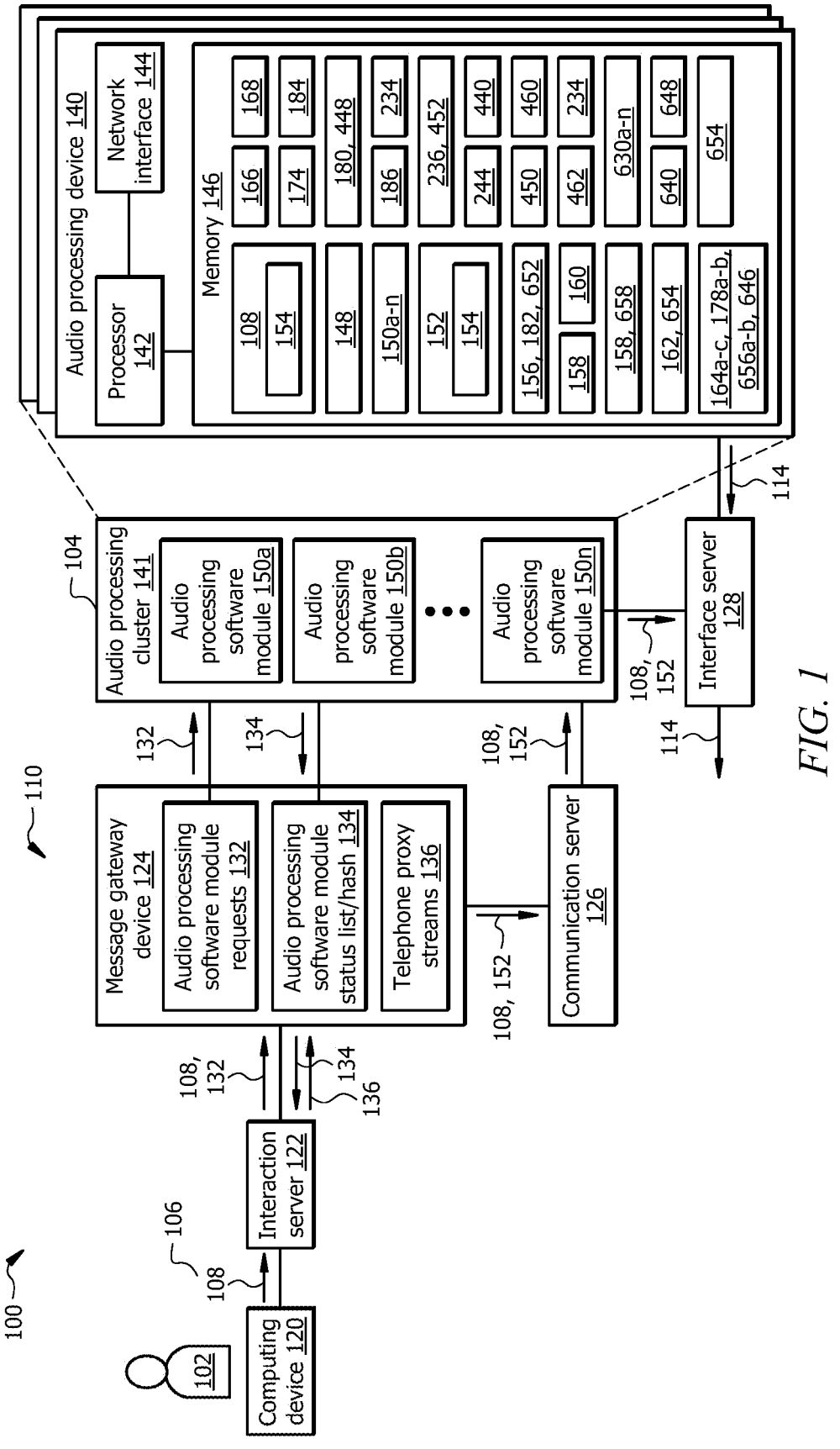
FIG. 1 illustrates an embodiment of a system configured to interpret a user's speech signal and to provide a response to a user.

FIG. 1 illustrates an embodiment of a system 100 that is generally configured to 1) generate a user-specific audio metadata dataset 244 for different topics/contexts based on the user's speech patterns, 2) split the user speech signal 154 into dynamic audio segments/frames based on the context 646 of the speech signal 154, and 3) determine dynamic audio slicing windows 630 based on the context 646 of the speech signal 154. In some embodiments, the system 100 comprises one or more audio processing devices 140 communicatively coupled with one or more computing devices 120, one or more interaction servers 122, one or more message gateway devices 124, one or more communication servers 126, and one or more interface servers 130 via a network 110. A user 102 may use the computing device 120 to initiate a communication (e.g., a phone call 108) with an entity 232 (e.g., a person or an automated voice assistant) associated with an organization 104. In response, the components associated with the organization 104 (and/or other components of the system 100) may process the user's incoming communication, generate a response 114 (e.g., in the form of text, audio, and/or video), and present the response 114 to the user 102 via the interface server 128. In other embodiments, system 100 may include other elements instead of, or in addition to, those listed above.

In general, the system 100 improves the audio processing of speech signals by contextually splitting the speech signal 154 into audio frames whenever a context change is detected within the speech signal. In order to analyze a speech signal 154, it needs to be split into smaller segments, so that an audio processing algorithm is able to analyze each segment and identify relevant linguistic and/or acoustic features. In the current systems, audio slicing is static-meaning that the audio slicing duration is statically set in terms of the number of words, number of sentences, or a predefined duration. However, this static audio slicing approach leads to sentences or words related to the same context/topic being separated into different audio segments. This leads to inaccuracies in analysis and understanding of the overall meaning and intent of the speech signal 154, reduced effectiveness in speech recognition algorithms, sentiment analysis, and misinterpretations of the speech signal 154 when the audio frames are processed independently of their full context.

Furthermore, the speech pattern of each user 102 may differ from other people. Thus, the static audio slicing fails to account for individual variations in speech patterns, such as rate, pause, intonations, etc. The lack of personalized dynamic audio slicing and processing leads to discrepancies in the interpretation of each user's speech. This is more evident in user-specific applications, such as personalized voice assistant analytics.

The disclosed system 100 provides technical solutions to these and other technical problems in the realm of speech recognition and interpretation. In some embodiments, the system 100 is configured to dynamically split a speech signal 154 into a set of audio frames 182 whenever a context change is detected based on the historical audio recordings of conversations between the user 102 and other people, when the user 102 has communicated with entities 232 at the organization 104. For example, the system 100 determines the context of each word 170 and generates a context vector for each word 170 uttered in the speech signal 154. The system 100 also detects flicker noise signals 236 within the speech signal 154. In some cases, when a flicker noise signal 236 is detected, it may indicate a pause in the speech of the user 102, where the pause may be due to a context change in the speech signal 154. Based on the context of each word 170 and the flicker noise signals 236, the system 100 may detect dynamic split points 180 during the speech signal 154 when a context change occurs and split the speech signal 154 at the detected split points 180. Thus, the system 100 provides a dynamic audio segmentation for a more precise interpretation and processing of the speech signal 154. This leads to generating a more accurate response 114 to the user 102's query on their communication (e.g., phone call 108) with the entity 232 associated with the organization 104.

In some cases, the tone and speech pattern of a user 102 may vary based on their current state of mind, emotion, or urgency situation. In such cases, the current speech processing systems are not able to adapt to variations in the speech of the user 102 that are caused due to the current circumstances of the user 102. The static audio slicing approach fails to capture these variations, and it may lead to inaccurate speech recognition and interpretation. The system 100 is configured to provide technical solutions to these and other technical problems in the realm of speech signal recognition and interpretation. In some embodiments, the system 100 is configured to dynamically change the audio slicing window/duration based on the current user's interaction (e.g., call 108 conversation) with entity 232 at the organization 104. For example, the system 100 may increase or decrease the audio slicing window to adapt to the current circumstance of the user 102 and to capture more accurate context changes/transitions during the user's speech signal 154 for interpretation, transcription, and generating a more accurate response 114 to the user 102. For example, the system 100 analyzes the user's speech signal 154 to detect tone, changes in speed, volume, and pitch that may indicate a change in emotion, urgency, or state of mind of the user. In response, the system 100 may dynamically change the audio slicing window 630 based on the detected changes. For example, during a fast speech burst that may indicate urgency or excitement, the system 100 may reduce the audio slicing window to capture more granular details in each audio slice. This leads to a more accurate speech recognition and interpretation in cases where there is evidence of a change in emotion or state of mind of the user in the speech signal 154 compared to historical speech recordings of the user 102, where the intelligence from the historical speech recordings may not include data about the current variation in the user's speech pattern.

The current speech-to-text transcription and speech recognition algorithms face challenges that reduce their accuracy and reliability. For example, the current speech-to-text transcription and speech recognition algorithms suffer from limited bandwidth and inefficiencies of audio codecs, which degrade audio quality and consequently transcription accuracy. Additionally, complications in speech transcription arise when multiple audio channels, such as those from a conference call 108 between several speakers, are combined into a single audio stream. This confuses the current transcription systems, as to which is the user of interest, and leads to further inaccuracies as the current systems struggle to isolate individual speakers and comprehend overlapping dialogues.

The system 100 is configured to provide technical solutions to these and other technical problems in the realm of speech signal recognition and interpretation. In some embodiments, the system 100 is configured to deploy several audio processing software modules 150*a-n* in conjunction with each other, where each audio processing software module 150 (e.g., any of the audio processing software modules 150*a-n*) is given the same audio stream but is configured with a different audio slicing window 630 (e.g., any of the audio slicing window 630*a-n*) and/or captures different frequency ranges from the speech signal 154. Thus, the system 100 is able to cross-reference and compare the effect of multiple audio slicing windows 630 on the context change detection and context accuracy across multiple audio slicing windows 630. For example, the system 100 uses multiple audio slicing windows 630 to slice a first part of the audio stream (e.g., a first few seconds of the speech signal 154) and compares the context of each audio frame 652 with a subsequent audio frame 652 per audio slicing window 630.

In response, the system 100 selects one of the audio slicing windows 630 that leads to the contextual splitting of the first part of the audio stream and uses the selected audio slicing window 630 for the next part of the audio stream. The system 100 is configured to iteratively perform these operations for each part of the audio stream, one audio frame 652 at a time, until the end of the audio stream. Thus, at every instance, a different, more appropriate audio slicing window 630 may be selected to perform the audio slicing on one or more audio frames 652 on the audio stream. Thus, the system 100 adapts to the current changes in the user's speech signal 154 to capture more accurate context changes. This leads to a more accurate slicing of the audio stream and speech recognition based on changes in context and other variations in the speech, e.g., background noise, bandwidth fluctuations, tone, pitch, speed, etc. Thus, the system 100 dynamically adapts the audio slicing window 630 based on feedback on the context change detection and transcription accuracy of the current and one or more preceding audio frames 652.

The system 100 is further configured to separate audio streams within the same call 108, where each speaker is assigned a dedicated audio processing software module 150 that focuses on analyzing their speech. The system 100 is configured to perform the adaptive audio slicing process per speaker's speech. This reduces the errors and misinterpretations caused by overlapping conversations. The audio processing software modules 150 are configured to dynamically switch between different audio streams to balance context detection and transcription quality against bandwidth requirements. For example, in a bandwidth-constrained environment, the system 100 may opt for an audio codec that compresses audio to reduce the bandwidth consumption. In another example, in a bandwidth-rich environment, the system 100 may choose a higher-quality codec to increase speech recognition and transcription accuracy. In another example, more audio processing software modules 150 and resources may be allocated to a conference call 108 with more than two speakers compared to a call 108 with only two speakers. In this manner, the system 100 reduces errors and inaccuracies in context detection and transcription, improves the quality and accuracy of context detection and transcriptions, and improves the accuracy of responses 114 to users 102.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol, as would be appreciated by one of ordinary skills in the art.

Example Computing Device

Computing device 120 may generally be any device that is configured to process data and interact with users 102. Examples of the computing device 120 include but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IOT) device, or any other suitable type of device. The computing device 120 may include a user interface, such as a display, a microphone, a camera, a keypad, or other appropriate terminal equipment usable by user 102.

The computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein.

The user 102 may use the computing device 120 to communicate with the organization 104, for example, via a phone/video call 108 to a computing device (e.g., a phone, a computer device, etc.) at the organization 104.

Interaction Server

The interaction server 122 may include one or more hardware computer systems, such as workstations, virtual machines, etc. For example, the interaction server 122 may be implemented by a plurality of computing devices using distributed computing and/or cloud computing systems in a network. In some embodiments, the interaction server 122 may be one or more servers in a server farm. In some embodiments, the interaction server 122 may include one or more servers in one or more data centers, data warehouses, and the like. The interaction server 122 may be an instance of one or more servers. In certain embodiments, the interaction server 122 may be configured to provide services and resources (e.g., data and/or hardware resources) to the components of the system 100. The interaction server 122 may manage and route the audio/video call flows 106 between the computing devices 120 and the computing devices at the organization 104. For example, the interaction server 122 may receive an incoming call 108 from the computing device 120 and determine the requirements for audio processing based on the number of speakers on the incoming call 108, the number of audio streams, etc.

The interaction server 122 may send requests for the required number of audio processing software modules 150 (i.e., the audio processing software module request 132) based on the number of speakers on the call 108 and the number of audio streams in the call 108 in case of conference calls, etc. The request 132 may include metadata that indicates the number of speakers on the call 108 and the number of audio streams in the call 108. The interaction server 122 may send the request 132 to the message gateway device 124 for processing.

The interaction server 122 may handle, manage, and route incoming and outgoing calls 108 between the computing devices 120 and the computing devices at the organization 104. The interaction server 122 may monitor each call 108 and manage the quality of each call 108. For example, the interaction server 122 may adjust bandwidth allocation, manage, and select audio codec based on call quality requirement and bandwidth usage, and implement error correction to reduce data packet loss during the call 108, in conjunction with other components of the system 100.

Message Gateway Device

The message gateway device 124 may include one or more hardware computer systems, such as workstations, virtual machines, databases, etc. For example, the message gateway device 124 may be implemented by a plurality of computing devices using distributed computing and/or cloud computing systems in a network. In some embodiments, the message gateway device 124 may be a server in a server farm. In some embodiments, the message gateway device 124 may include one or more servers in one or more data centers, data warehouses, and the like. The message gateway device 124 may be an instance of one or more servers. In certain embodiments, the message gateway device 124 may be configured to provide services and resources (e.g., data and/or hardware resources) to the components of the system 100. The message gateway device 124 may act as a publication-subscription messaging system that facilitates communication between different components of the system 100. For example, downstream components of the system 100 to an incoming call 108 from the computing device 120 may subscribe to the message gateway device 124 to receive the incoming call 108. Then, the message gateway device 124 may publish the incoming call 108 to the subscribed components (including the audio processing cluster 141, etc.).

Communication Server

The communication server 126 may include one or more hardware computer systems, such as workstations, virtual machines, etc. For example, the communication server 126 may be implemented by a plurality of computing devices using distributed computing and/or cloud computing systems in a network. In some embodiments, the communication server 126 may be a server in a server farm. In some embodiments, the communication server 126 may include one or more servers in one or more data centers, data warehouses, and the like. The communication server 126 may be an instance of one or more servers. In certain embodiments, the communication server 126 may be configured to provide services and resources (e.g., data and/or hardware resources) to the components of the system 100. In one example, the communication server 126 may be a telephony computer system that is configured to transmit the call signal 118 to the subscribed and selected audio processing software module 150 in the audio processing cluster 141. The communication server 126 may manage, initiate, maintain, and terminate calls 108. The communication server 126 may further perform other call controls, such as call routing, call forwarding, call waiting, conference calling, and the like, in conjunction with other components of the system 100.

Interface Server

The interface server 128 may include one or more hardware computer systems, such as workstations, virtual machines, etc. For example, the interface server 128 may be implemented by a plurality of computing devices using distributed computing and/or cloud computing systems in a network. In some embodiments, the interface server 128 may be a server in a server farm. In some embodiments, the interface server 128 may include one or more servers in one or more data centers, data warehouses, and the like. The interface server 128 may be an instance of one or more servers. In certain embodiments, the interface server 128 may be configured to provide services and resources (e.g., data and/or hardware resources) to the components of the system 100. The interface server 128 may receive audio from one or more audio processing software modules 150 and convert it into machine-readable text, human-readable text, and/or the like.

For example, the interface server 128 may include and implement a machine learning algorithm and neural network to perform some or all of its functions, such as process received audio frames to interpret the words within the audio frames, transcribing the speech in the audio frames into text, generate a response 114 (in form of text and/or audio and/or video) to the topic discussed in the audio frames, and present the response on a user interface, such as monitor display and/or communicate the audio response to a speaker.

The interface server 128 may determine the context and semantics of the speech in the audio frames, and identify information indicated in the audio, such as names, dates, commands, emotion, etc. The interface server 128 may generate a response 114 to the speech of the user 102 based on the determined information from the speech. In some embodiments, the interface server 128 may reply to the user 102 in the form of the response 114, such as displaying the text response on a display screen of the interface server 128 or a display screen on any other component of the system 100.

In some embodiments, the interface server 128 may use the information extracted from the speech of the user 102 from the audio frames to search for information that the user 102 has requested (e.g., from the user profile stored in a memory accessible to the interface server 128, from the Internet, documents accessible to the interface server 128, etc.), fetch the requested information, and present the information to the user 102 in form of text, audio, and/or video response 114.

In some embodiments, the operations of the interface server 128 may be performed by the audio processing device 140. For example, the audio processing device 140 may generate responses 114 based on context detection and speech recognition operations performed on the speech signal 154. In some embodiments, an instance of the interface server 128 may reside within each audio processing device 140. For example, the interface server 128 may act as an interface for the audio processing device 140.

Audio Processing Cluster

The audio processing cluster 141 may include a set of audio processing devices 140. In some embodiments, the audio processing cluster 141 may be distributed across one or more data centers, server farms, and the like. Each of the audio processing devices 140 may be an instance of a computing device, such as a workstation, a virtual machine, etc. The audio processing cluster 141 may be implemented by a plurality of audio processing devices 140 using distributed computing and/or cloud computing systems in a network. In some embodiments, the audio processing cluster 141 may include one or more audio processing devices 140 in one or more data centers, data warehouses, and the like. In certain embodiments, the audio processing cluster 141 may be configured to provide services and resources (e.g., data and/or hardware resources) to the components of the system 100.

A set of audio processing software modules 150*a-n* may be generated in and used by the audio processing cluster 141, for example, in one or more audio processing devices 140. Each audio processing software module 150*a-n* may be used to analyze and interpret a different speech signal 154 in the call 108 during the call flow 106. Each audio processing software module 150*a-n* may be designated to a different speech signal 154 to analyze and interpret. These operations are described in greater detail in FIGS. 2-7. In this disclosure, an audio processing software module 150 may be interchangeably referred to as an audio processing software algorithm.

The audio processing device 140 may include a processor 142, operably coupled to a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate array (FP-GAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding items. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU, and it stores the results of ALU operations. The processor 142 may further include a control unit that fetches instructions from memory, and it executes them by directing the coordinated operations of the ALU, registers, and other components. The one or more processors are configured to implement various software instructions. For example, the one or more processors are configured to execute instructions (e.g., software instructions 148) to perform the operations of the audio processing device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-7. For example, the processor 142 may be configured to perform one or more operations of the operational flow 200, described in FIG. 2, and one or more operations of the method 300, as described in FIG. 3; one or more operations of the operational flow 400, described in FIG. 4, and one or more operations of the method 500, as described in FIG. 5; one or more operations of the operational flow 600, described in FIG. 6, and one or more operations of the method 700, as described in FIG. 7.

Network interface 144 is configured to enable wired and/or wireless communications. The network interface 144 may be configured to communicate data between the audio processing device 140 and other devices, systems, or domains of the system 100. For example, the network interface 144 may comprise a near-field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile; and it may comprise read-only memory (ROM), random-access memory (RAM), ternary content-addressable memory (TCAM), dynamic random-access memory (DRAM), and static random-access memory (SRAM). The memory 146 may include one or more of local databases, cloud databases, network-attached storages (NAS), etc. The memory 146 comprises one or more disks, tape drives, or solid-state drives; and it may be used as an over-flow data storage device to store programs, when such programs are selected for execution and to store instructions and data that are read during program execution. The memory 146 may store any of the information described in FIGS. 1-7 along with any other data, instructions, logic, rules, or code operable to implement the function(s) described herein when executed by processor 142. For example, the memory 146 may store software instructions 148, audio recordings 152 (that include speech signal 154), word-context dataset 158, voice print 166, frequency features 234, word vector 174, user audio metadata dataset 244, global audio metadata dataset 440, context vector 186, split points 180, 448, noisy speech signal 450, text 654, machine learning algorithm 160, flicker noise signals 236, 452, text 162, 654, contexts 164*a-c*, 178*a-b*, 656*a-b*, 646, audio processing algorithm 168, audio frames 156, 182, 652, contextual split text 184, differences 462, global user audio dataset 640, lookup table 648, historical user speech patterns 460, word-context datasets 158, 658, audio processing software module 150*a-n*, call 108 (that includes speech signal 154), audio slicing windows 630*a-n*, spectrogram frequency features 234, and/or any other data or instructions. The software instructions 148 may comprise any suitable set of instructions, logic, rules, or code operable to execute the processor 142 and to perform the functions described herein, such as some or all of those described in FIGS. 1-7.

Each audio processing software module 150 may be implemented by the processor 142, executing the software instructions 148, and is generally configured to interpret a speech signal 154 and to split the speech signal 154 contextually into a set of audio frames. An audio processing software module 150 may be, or include, audio processing algorithms configured to perform the operations of the audio processing software module 150. The audio preprocessing algorithm 168 may be implemented by the processor 142, executing the software instructions 148, and is generally configured to remove background noises from a speech signal 154 and to normalize the speech signal 154. This process is described in more detail in FIG. 2.

Call Flow Between the User and an Organization

In operation, when a new call 108 is initiated between the user 102 and an entity 232 (e.g., to an automated call assistant or a person), the interaction server 122 determines the requirements for the audio processing for the speech signal 154 of the user 102 based on the number of speakers on the call 108, number of audio streams on the call 108 for conference call 108, etc. The interaction server 122 sends the request 132 to the message gateway device 124 to assign audio processing software modules 150 to the call 108, based on the determined requirements for the audio processing for the speech signal 154, the number of speakers on the call 108, number of audio streams on the call 108 for conference call 108, and/or other metadata, such as call identifier for the call 108.

In response, the message gateway device 124 forwards the request 132 to the subscribed audio processing cluster 141, which is subscribed to the message gateway device 124. The audio processing cluster 141 dedicates an audio processing software module 150 to each speaker to analyze the speech signal 154 of each speaker on the call 108.

The audio processing cluster 141 updates the audio processing software module list/hash 134 with their status, indicating which audio processing software modules 150 are assigned to call 108. The audio processing cluster 141 also replies back to the message gateway device 124 and/or the interaction server 122 with the list/hash 134 of the selected audio processing software modules 150 and information about the selected audio processing software modules 150, where the information may include an Internet Protocol (IP) address, port number, audio format, and/or other information about each selected audio processing software module 150.

The interaction server 122 may send the instructions 112 (included in the telephony proxy streams 136) to the message gateway device 124, where the instructions 112 indicate to begin sending audio (e.g., the call 108, audio recording 152) to the designated audio processing software modules 150. In response, the message gateway device 124 sends the audio (e.g., the call 108, audio recording 152) to the designated audio processing software modules 150. In the example of FIG. 1, the designated audio processing software module 150*n* is the designated module. However, any, and any combination of, audio processing software modules 150*a-n* may be a designated module 150.

The designated audio processing software modules 150 may reformat the received call 108, call recording 152, into a format that is compatible with and digestible by the interface server 128 and send it to the interface server 128, e.g., over web sockets. Each audio processing software module 150 may process and analyze its respective speech signal 154 and split the speech signal 154 into a dynamic set of audio frames 156, 182, 652, based on the context, speech patterns, and other characteristics of the speech signal 154, such as the set of audio frames are contextually split, and each audio frame belongs to a respective context. Examples of this operation are described in greater detail in the discussion of FIGS. 2-7.

In response, a response 114 may be generated by the audio processing device 140 and/or the interface server 128, where the response 114 addresses the query of the user 102 indicated during the call 108. The response 114 may be presented to the user 102, e.g., via the interface server 128.

The word-context dataset 158 may include a set of words (e.g., represented by word vectors), where each word is associated with one or more respective contexts. For example, a set of words, including code, programming, and syntax maybe represented by word vectors and associated with the programming language context.

The machine learning algorithm 160 may be implemented by the processor 142, executing the software instructions 148, and is generally configured to determine context, to transcribe audio to text, and to perform other functions described herein. The machine learning algorithm 160 may comprise a support vector machine, neural network, random forest, k-means clustering, etc. The machine learning algorithm 160 may be implemented by a plurality of neural network (NN) layers, convolutional NN (CNN) layers, Long-Short-Term-Memory (LSTM) layers, Bi-directional LSTM layers, recurrent NN (RNN) layers, and the like. In some examples, the machine learning algorithm 160 may be implemented by natural language processing (NLP), data processing, audio processing, speech recognition, text recognition, generative text processing, etc. In certain embodiments, the machine learning algorithm 160 may perform word segmentation, sentence segmentation, word tokenization, sentence tokenization, and analysis on a given data (e.g., call 108, audio recording 152, text 162, etc.) to detect the context 164, voice print 166, among other data from the given data.

The audio processing software module 150 may be executed by the processor 142, and it includes software instructions that, when executed by the processor 142, cause the processor 142 to perform one or more operations of the audio processing software module 150 described herein. For example, the audio processing software module 150 may be configured to receive a speech signal 154 (e.g., in a call 108, an audio recording 152), which is in an unsecured, raw audio format, and to convert it into secured formatted audio which is compatible with the interface server 128.

In some embodiments, the audio processing software module 150 may accept single or multiple channels of raw speech signal 154. In some embodiments, the audio processing software module 150 may buffer the speech signal 154 to reduce the data packet losses in transmission. In some cases, an input audio may arrive out of order. Thus, in some embodiments, the audio processing software module 150 may be configured to re-order the data packets comprised in the speech signal 154 into the correct order and to transmit the re-ordered data packets to the downstream systems.

In some embodiments, the audio processing software module 150 may save the output of the processed speech signal 154 as a file and act as a call recorder. In some embodiments, the audio processing software module 150 may accept multiple channels for combining into a single data stream; for example, in the case of conference calls that have multiple channels. In some embodiments, the audio processing software module 150 may be reassigned or reallocated to another call 108 or another communication server 126, based on demand changes for additional audio processing resources for the other call 108. In some embodiments, the audio processing software module 150 may be configured to allow streaming audio to be fed into a call 108, for example, in the form of an automated, dynamic (or static) audio response 114.

Figure 2:
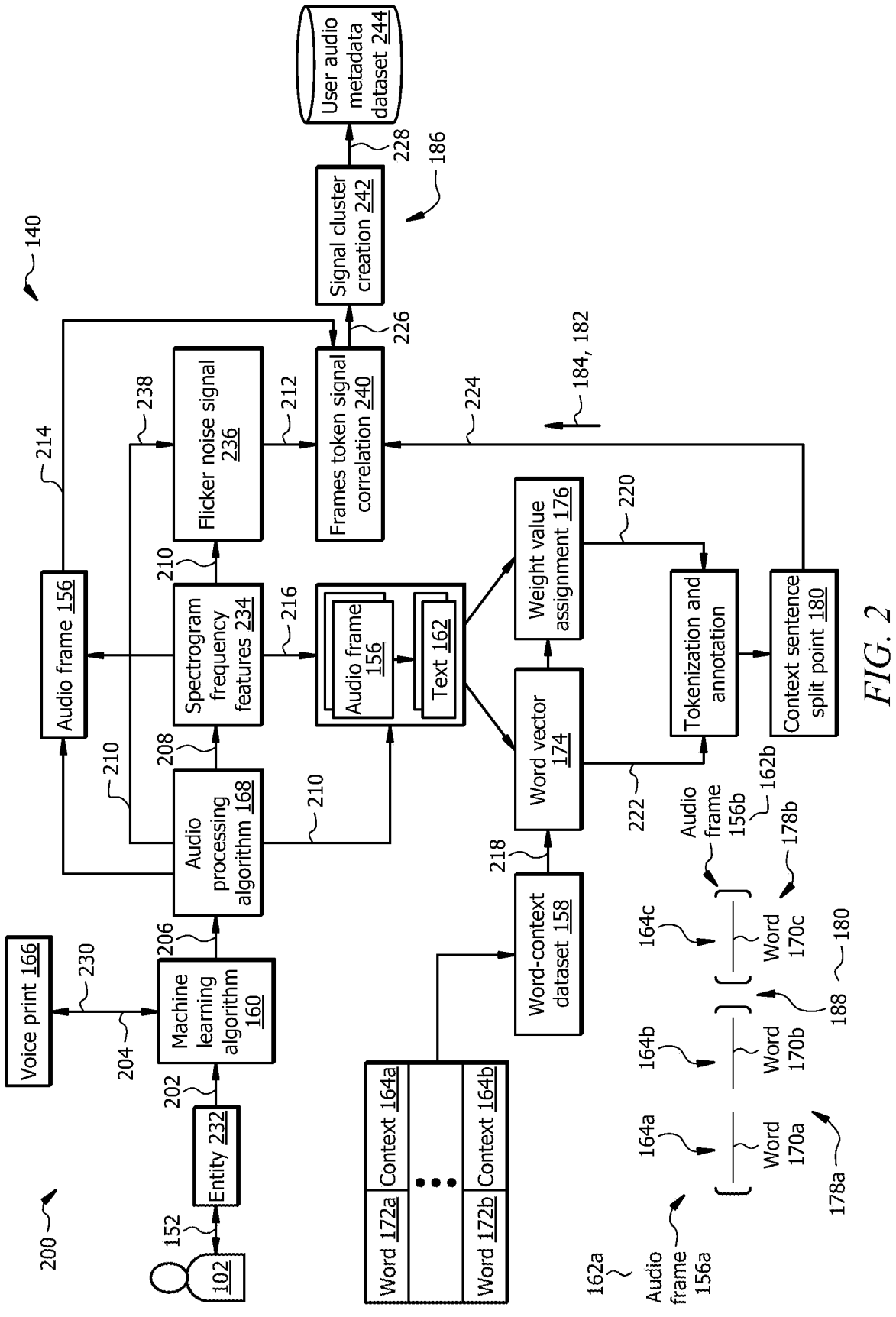
FIG. 2 illustrates an example operational flow of the system of FIG. 1 for contextual analysis and user audio metadata database generation for user-specific speech patterns.

Operational Flow for Contextual Analysis and Metadata Database Generation for User-Specific Speech Patterns FIG. 2 illustrates an example operational flow 200 of system 100 (see FIG. 1) for contextual analysis and user audio metadata database 244 generation for user-specific speech patterns. In operation, the operational flow 200 may begin at operation 202, where current and historical audio recordings 152 are obtained by the audio processing device 140.

The audio recording 152 may include recordings of calls 108 between the user 102 and one or more other entities 232 (e.g., people, automated voice assistant, etc.) associated with the organization 104. Each audio recording 152 may include a conversation between the user 102 and the other entity 232 during a respective interaction session 230 between the user and an entity 232. In response to obtaining the audio recordings 152, the audio processing device 140 may extract the voice print 166 associated with the user 102 from the audio recording 152. The voice print 166 may include a tone of speech, speech pattern, Mel frequency spectrum of the speech signal 154 of the user 102, pitch, and other characteristics of the voice of the user 102.

The audio processing device 140 may extract the voice print 166 by implementing the machine learning algorithm 160. In this process, the audio processing device 140 may feed the audio recordings 152 to the machine learning algorithm 160, and the machine learning algorithm 160 may process the audio recordings 152 by an audio processing neural network. The machine learning algorithm 160 may extract a set of audio signal features, such as signal frequencies, signal amplitudes, signal durations, and spectral characteristics from the audio recordings 152. In response, the machine learning algorithm 160 may analyze the extracted signal features to identify patterns, voice signatures, and voice characteristics of each speaker on the audio recordings 152.

In response, at operation 204, the machine learning algorithm 160 may determine the voice print 166 of the user 102 and separate the speech signal 154, associated with the user 102, from other speech signals 154, associated with other entities 232, based on the extracted voice print 166 of the user 102 and other voice prints 166 that belong to other entities 232.

Audio Signal Pre-Processing

At operation 206, the collected speech signals 154 of the user 102 may be forwarded to the audio processing algorithm 168. The audio processing algorithm 168 may remove background noise signals from the speech signals 154 and normalize the speech signals 154. In the process of removing background noise signals, the audio processing algorithm 168 may implement a high-pass filter to filter out the frequency signals that have amplitudes and/or frequencies less than a threshold amplitude (e.g., less than 20 decibels (dB), etc.) and/or less than a threshold frequencies (e.g., less than 1 Kilo hertz (KHz), etc.) to reduce the ambient, noise signals. The high-pass filter may be implemented in hardware (operably coupled with the processor 142), software (included in the software instructions 148), and/or firmware (with the processor 142 and software instructions 148). In the process of normalizing, the audio processing algorithm 168 may adjust the speech signals 154 to maintain a normalized range for signal amplitudes across the speech signal 154. This reduces the effect of amplitude variations across the speech signals 154.

At operation 208, the audio processing algorithm 168 may further extract a set of spectrum frequency features 234 from the speech signal 154, where the frequency features 234 may include frequency amplitudes, frequency bandwidths, frequency modulations, harmonic content, and features about the speech signal 154 in the time domain, such as jitter, temporal variations, etc. At operation 210, the flicker noise frequency signal 236 extraction is performed on the processed speech signal 154, e.g., by the audio processing algorithm 168. In this operation, the audio processing algorithm 168 may detect a set of flicker noise signals 236 within the speech signal 154, based on the extracted set of frequency features 234. For example, a flicker frequency signal 236 may correspond to a frequency signal, that has a frequency less than a threshold frequency 238, such as less than 100 KHz, etc. The output of the audio processing algorithm 168 is passed to the machine learning algorithm 160.

At operation 212, the result of operation 210 (e.g., the filtered speech signal 154 with reduced or filtered flicker noise signals 236) is passed to the machine learning algorithm 160. At operation 214, the machine learning algorithm 160 may split the speech signal 154 into a set of audio frames 156, where each audio frame 156 includes an utterance of one or more words that is uttered in the speech signal 154 by the user 102. At this operation, the audio frames 156 are statically split, for example, each audio frame 156 may have a predefined duration, such as 1 second, 2 seconds, etc. This operation is to split the speech signal 154 into smaller segments or frames, so that it is easier to analyze for the machine learning algorithm 160. The audio frames 156 are fed to the machine learning algorithm 160. At operation 216, the processed and filtered speech signal 154 and audio frames 156 are passed to the machine learning algorithm 160.

Context Detection

The machine learning algorithm 160 may perform the following operations on each audio frame 156. The machine learning algorithm 160 may convert each audio frame 156 into a respective text 162. In this process, the machine learning algorithm 160 (which includes a neural network speech-to-text convertor algorithm) may extract audio features, such as Mel Frequency Cepstral Coefficients (MFCCs), which provide a representation of the short-term power spectrum of each audio frame 156, and other features. The machine learning algorithm 160 determines the linguistic features, phonetic features, and patterns based on the extracted features. In response, the machine learning algorithm 160 may detect the words 170 in each audio frame 156. For example, the machine learning algorithm 160 may determine that a first audio frame 156a includes two words 170a-b, thus the text 162a of the first audio frame 156a includes the two words 170a-b.

At operation 218, the machine learning algorithm 160 may determine the context 164 of each word 170 in the text 162 of an audio frame 156 by referencing the word-context dataset 158. In this process, the machine learning algorithm 160 may compare each word 170 in the audio frame 156 with each word 172 in the word-context dataset 158. If the machine learning algorithm 160 finds a corresponding word 172 that corresponds to the word 170, it determines that the word 170 has the same context 164 as the word 172. For example, the machine learning algorithm 160 may compare the word 170a with each of the words 172a-b, and it may be determined that the word 170a corresponds to the word 172a (e.g., they are the same or similar words). In response, the machine learning algorithm 160 may determine that the word 170a has the context 164a. Similarly, the machine learning algorithm 160 may determine that the word 170b has the same context 164b as the word 172b if the word 170b corresponds to the word 172.

The machine learning algorithm 160 may generate a word vector 174 for each word 170, where a word vector 174 may include numerical values that represent features of the respective word 170, such as syntactic role, context, semantic meaning, position in the text 162 of the audio frame 156, relation to other words 170 in the text 162 of the audio frame 156, among others. The word vectors 174 are generated by word embedding models of the machine learning algorithm 160, which are trained to place semantically similar words close together in the vector space. For example, the distance between similar or corresponding words 170 is less than a threshold distance.

The machine learning algorithm 160 may group the semantically similar words 170 together based on close word vectors 174 that are close together in the vector space (e.g., that are less than a threshold distance (e.g., less than 0.1, 0.2, etc.) apart from each other in the vector space). In some embodiments, the machine learning algorithm 160 may assign a weight value 176 to each word vector 174 (and/or each word 170) based on the context 164 and the occurrence frequency of the respective word 170.

In some embodiments, the weight value 176 assigned to a word vector 174 (and the word 170) may be proportional to the occurrence frequency of the word 170 within the text 162 and/or within the audio frame 156 and/or within the speech signal 154. For example, if the context 164 of a word 170 is relevant to a service provided by the organization 104 and/or relevant to the context 164 of other words 170, the word 170 (and the word vector 174) may be given a higher weight value 176 compared to other words 170, that are related to irrelevant context 164 and/or services. In another example, if a word 170 is mentioned more than other words 170 in the text 162 and/or the speech signal 154 (in other words, the occurrence frequency of the word 170 is more than other words 170), the word 170 may be more indicative of the overall context 178 of the audio frame 156 and/or the overall context 178 of the speech signal 154 compared to other words 170. In another example, if a word 170 is mentioned more than a threshold number in the text 162 and/or the speech signal 154 (in other words, the occurrence frequency of the word 170 is more than the threshold number (e.g., more than five, six, ten, etc.)), the word 170 may be more indicative of the overall context 178 of the audio frame 156 and/or the overall context 178 of the speech signal 154. The machine learning algorithm 160 may combine these factors (i.e., occurrence frequency and context 164) of a word 170 to determine the weight value 176 for the word 170 and its word vector 174 to balance between context relevance and statistical presentence of the word 170.

Splitting Audio Frames Based on Context Changes

In operation 220, the machine learning algorithm 160 may tokenize each word vector 174 (and respective word 170), meaning that it separates and annotates each word vector 174 (and respective word 170) individually, e.g., with its respective context and weight value 176, among others. In operation 222, the machine learning algorithm 160 may understand the given audio text 162 and the assigned weight value 176 in conjunction with the word-context database 158 and annotate the tokens (i.e., tokenized word vectors 174 that has a common context 164) as a group. These tokens may help the machine learning algorithm 160 to split a given sentence across one or more pieces of text 162 (across one or more audio frames 156) contextually, such that each split is related to a different context.

Thus, this process is a user-specific context speech/sentence separation, rather than a general context separation, which may not apply to all users 102 because each individual user 102 may have a different speech pattern, speech tone, speech speed, pitch, intonations, speech fluctuations, etc. The machine learning algorithm 160 may perform these operations 216 to 222 for each audio frame 156 in parallel and/or series.

The machine learning algorithm 160 may determine the context 178 associated with each audio frame 156, based on the context 164 of the words 170 within the respective audio frame 156. For example, if the majority (or more than a threshold percentage (e.g., more than 90%, 95%)) of the words 170 in the text 162 of the audio frame 156 are related to the same context 164 as each other, the machine learning algorithm 160 may determine that the overall context 178 of the text 162 (and the audio frame 156) corresponds to the context 164.

In the example of FIG. 2, assume that the first audio frame 156a and its respective text 162a include words 170a and

170b; the word 170a has the context 164a; and the word 170b has the context 164b. The machine learning algorithm 160 may determine the context 178a of the audio frame 156a and text 162a based on the context 164a-b. Similarly, assume that the second audio frame 156b and its respective text 162b include word 170c. The machine learning algorithm 160 may determine the context 178b of the audio frame 156b and text 162b based on the context 164c.

The machine learning algorithm 160 may split the overall text 162 of all audio frames 156 contextually by detecting split points 180, where a context change is detected. For example, based on the identified contexts 164 and 178 within each text 162 of each audio frame 156, the machine learning algorithm 160 may determine similarities and differences among the contexts 164, 178 across the audio frames 156. Some split points 180 may be within an audio frame 156/text 162 and other split points 180 may be between the audio frames 156/text 162.

For example, assume that the machine learning algorithm 160 detects a context change between the first text 162a of the first audio frame 156a and the second text 162b of the second audio frame 156b based on the differing contexts 178a and 178b determined for the first text 162a and second text 162b, respectively.

At operation 224, the output (e.g., the detected split points 180 that may indicate a context change) may be combined with the information about the detected flicker noise signals 236. In frame token signal correlation operation 240, the machine learning algorithm 160 may generate a contextually split set of audio frames 182 by splitting the speech signal 154 (and/or the overall text 162) into a set of contextual audio frames 182 that are organized according to the detected contexts 178a-b, and so forth, and flicker noise signals 236.

The contextual audio frames 182 may be dynamically split, such that each of the audio frames 182 is associated with a respective context 178. Each contextual audio frame 182 may be accompanied by and/or associated with a respective contextual piece of text 162. In this process, for example, the machine learning algorithm 160 may integrate the flicker noise signals 236 with the contextual information from the text 162 (e.g., context changes based on contexts 178) to fine-tune the determination of the split points 180. For example, a flicker noise signal 236 may indicate a pause or hesitation by the user 102 in the speech signal 154, which may provide additional cues about a potential context change.

The machine learning algorithm 160 may analyze both flicker noise signals 236 and the contextual information and determine more accurate split points 180 within the speech signal 154 (and the overall text 162). For example, if a drop in frequency (indicated by a flicker noise signal 236) coincides or aligns with a change in a context 178 from one audio frame 182 (and/or corresponding text 162) to the next audio frame 182 (and/or the next piece of text 162), this may be a further indication and confirmation of a context change 188.

The machine learning algorithm 160 may determine which flicker noise signals 236 may indicate a context change 188 and which may not, in conjunction with the potential contextual changes determined from the potential split points 180. In some embodiments, generating the contextually split set of audio frames 182 may include splitting the speech signal 154 at a first split point 180 where a context change 188 (based on the contexts 178) and a flicker noise signal 236 are detected. In some embodiments, generating the contextually split set of audio frames 182 may include splitting the speech signal 154 at a second split point 180, where a context change 188 (based on the contexts 178) and/or a flicker noise signal 236 is/are detected.

The machine learning algorithm 160 may generate a context vector 186 for one or more word vectors 74, one or more text 162, and/or one or more contextual audio frames 182 that are related to the same context 178. Each context vector 186 may include numerical values that represent the respective context 178.

At operation 226, in signal cluster creation 242, the machine learning algorithm 160 may group the respective context vectors 174 (and contextual audio frames 182 and text 162) that are related to the same context 178 together. The machine learning algorithm 160 may populate the user audio metadata dataset 244 by the groups of context vectors 174 (and respective contextual audio frames 182 and text 162) that are related to the same context 178 for further use.

Thus, the user audio metadata dataset 244 may include user-specific contextual information, that provides a comprehensive profile of the user 102's speech pattern, preferences, and historical language use. The system 100 may use the user audio metadata dataset 244 for analyzing and interpreting the user 102's speech in future calls 108. The machine learning algorithm 160 may dynamically update the user audio metadata dataset 244, as new calls 108 provide additional information about the speech patterns of the user 102.

In some embodiments, the audio processing device 140 may detect a topic uttered in a speech signal 154 of the user 102 in an incoming call 108 based on the contextually split audio frames 182. In response, the audio processing device 140 (alone or in conjunction with other components of the system 100) may generate a text response 114 to the detected topic and present the generated text response 114 on a user interface (e.g., via the interface server 128), similar to that described in FIG. 1. The user interface may be associated and in signal communication with the interface server 128 and/or the computing device 120.

In some embodiments, the audio processing device 140 may detect a topic uttered in a speech signal 154 of the user 102 in an incoming call 108 based on the contextually split audio frames 182. In response, the audio processing device 140 (alone or in conjunction with other components of the system 100) may generate an audio response 114 to the detected topic and communicate the generated audio response 114 to a speaker (e.g., via the interface server 128), similar to that described in FIG. 1. The speaker may be associated and in signal communication with the interface server 128 and/or the computing device 120.

Figure 3:
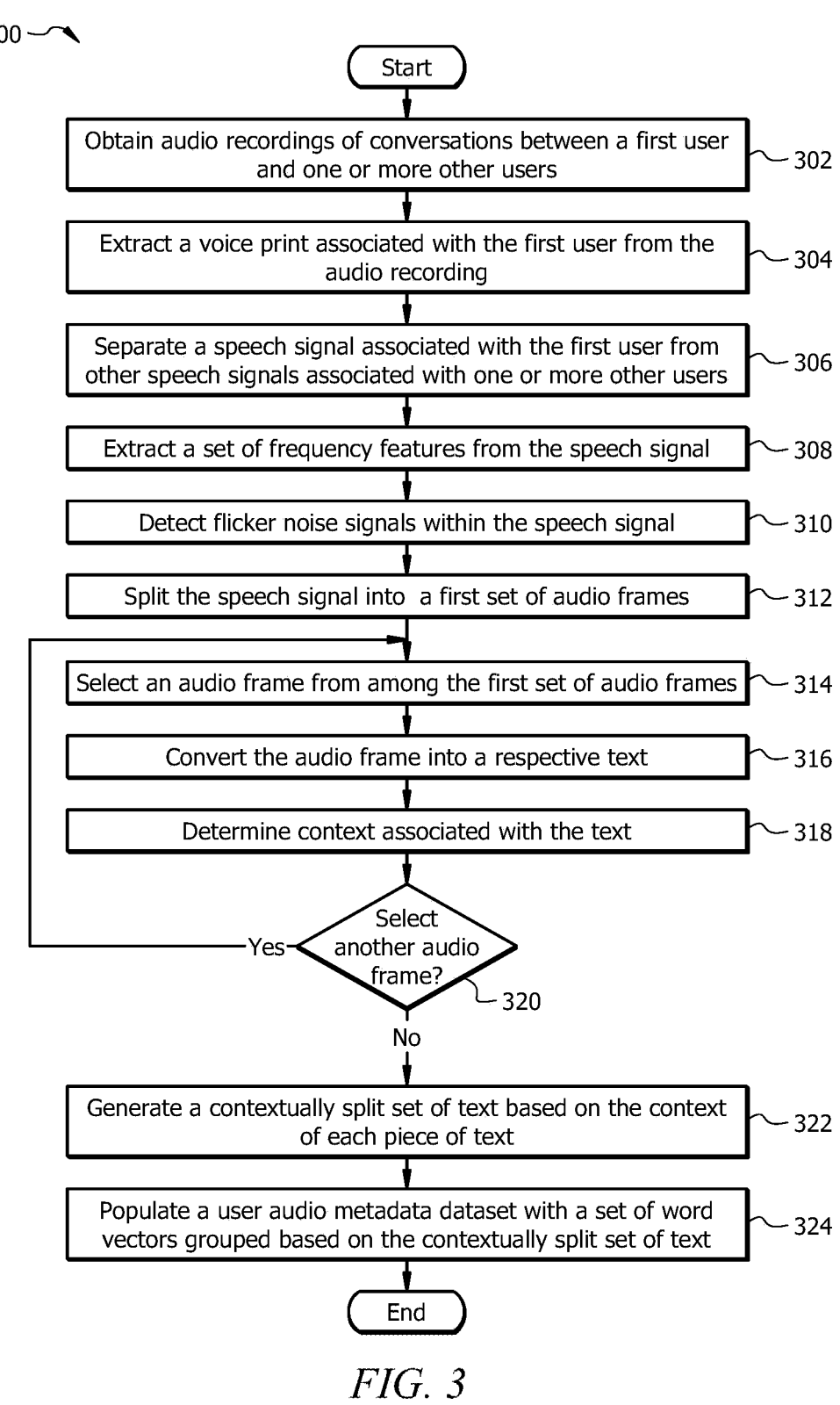
FIG. 3 illustrates an example flowchart of a method for contextual analysis and user audio metadata database 244 generation for user-specific speech patterns.

Method for Generating a User-Specific Audio Metadata Dataset for Different Topics Based on the User's Speech Patterns FIG. 3 illustrates an example flowchart of a method 300 to generate a user-specific audio metadata dataset 244 for different topics/contexts based on the user's speech patterns, according to some embodiments. Modifications, additions, or omissions may be made to method 300. Method 300 may include more, fewer, or other operations. For example, operations may be performed in parallel or in any suitable order. While at times, it is discussed that the system 100, audio processing device 140, or components of any thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 146 of FIG. 1) that, when run by one or more processors (e.g., processor 142 of FIG. 1), may cause the one or more processors to perform operations 302-324.

At operation 302, the audio processing device 140 obtains audio recordings 152 of conversations between a first user 102 and one or more other users. For example, the audio processing device 140 may receive the audio recordings 152 that were historically recorded during the calls 108 between the user 102 and one or more other users, similar to that described in FIG. 2.

At operation 304, the audio processing device 140 extracts a voice print 166 associated with the first user 102 from the audio recordings 152. For example, the audio processing device 140 may execute the machine learning algorithm 160 to extract the voice print 166 associated with the first user 102, similar to that described in FIG. 2. The audio processing device 140 may also extract voice prints 166 associated with other users/speakers on the audio recordings 152, similar to that described in FIG. 2.

At operation 306, the audio processing device 140 separates the speech signal 154 associated with the first user 102 from other speech signals associated with the one or more other users. For example, the audio processing device 140 may execute the machine learning algorithm 160 to perform this operation, similar to that described in FIG. 2.

At operation 308, the audio processing device 140 extracts a set of frequency features 234 from the speech signal 154. For example, the audio processing device 140 may execute the audio processing algorithm 168 to extract the frequency features 234 from the speck signal 154, similar to that described in FIG. 2.

At operation 310, the audio processing device 140 detects flicker noise signals 236 within the speech signal 154. For example, the audio processing device 140 may execute the audio processing algorithm 168 to perform this operation, similar to that described in FIG. 2. At operation 312, the audio processing device 140 splits the speech signal 154 into a first set of audio frames 156.

At operation 314, the audio processing device 140 selects an audio frame 156 from among the first set of audio frames 156. The audio processing device 140 may iteratively select an audio frame 156 until no audio frame is left for evaluation. At operation 316, the audio processing device 140 converts the audio frame 156 into a respective text 162. For example, the audio processing device 140 may implement/execute the machine learning algorithm 160 (which includes a speech-to-text convertor neural network) to perform this operation, similar to that described in FIG. 2.

At operation 318, the audio processing device 140 determines the context 178 associated with the text 162. For example, the audio processing device 140 may implement/execute the machine learning algorithm 160 to perform this operation, similar to that described in FIG. 2. The audio processing device 140 may generate a word vector 174 and assign a weight value 176 to the word vector 174 (and/or each word 170 in the text 162), similar to that described in FIG. 2.

At operation 320, the audio processing device 140 determines whether to select another audio frame 156. If it is determined that another audio frame 156 is left for evaluation, the method 300 returns to operation 314. Otherwise, the method 300 proceeds to operation 322. At operation 322, the audio processing device 140 generates a contextually split set of texts 184 (and accompanying contextually split set of audio frames 182) based on the context 164, 178 of each piece of text 162. The set of texts 184 (and audio frames 182) are contextually split, meaning that each of them is related to a different context. The audio processing device 140 may perform this dynamic splitting/slicing based on the split points 180, similar to that described in FIG. 2.

At operation 324, the audio processing device 140 generates the user audio metadata dataset 244 and populates the user audio metadata dataset 244 with a set of word vectors 186 grouped, based on the contextually split set of texts 184. The audio processing device 140 may use the audio metadata dataset 244 for analyzing and interpreting the user 102's speech in future calls 108 and preparing a response to the user 102. The user audio metadata dataset 244 output informs the system 100 (and audio processing device 140) how the speech signal of the user 102 should be contextually split, so that each split includes words related to the same context.

Figure 4:
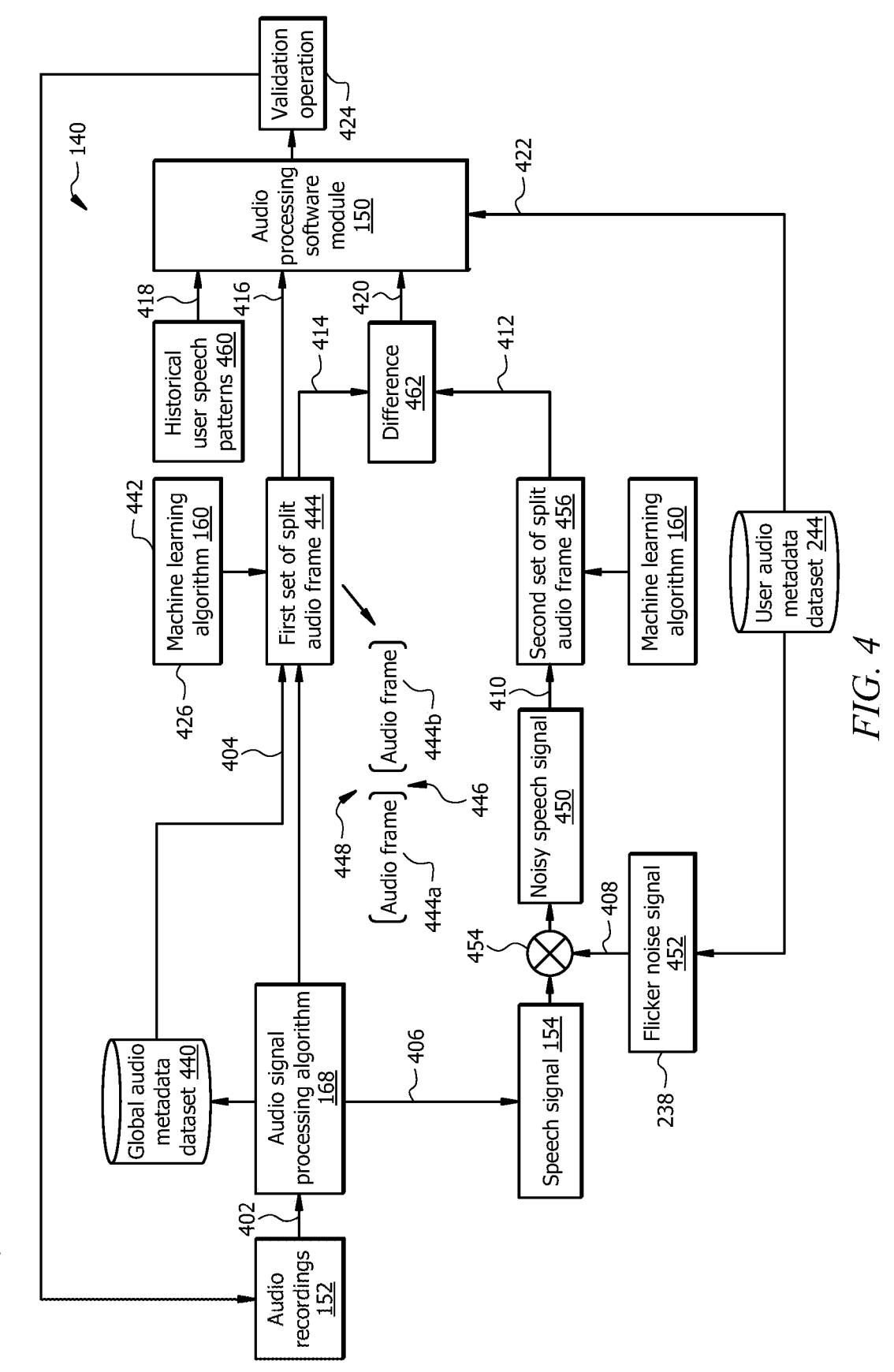
FIG. 4 illustrates an example operational flow of the system of FIG. 1 for adaptive audio segmentation for detecting context changes in speech.

Operational Flow for Adaptive Audio Segmentation for Detecting Context Changes in Speech FIG. 4 illustrates an example operational flow 400 of the system 100 (see FIG. 1) for adaptive audio segmentation for detecting context changes in speech signal 154. In the operational flow 400, the system 100 may: 1) split the speech signal 154 according to the historical speech patterns and context changes of multiple users, generating a first set of split audio frame 444; 2) in a first iteration, generate a noisy speech signal 154 by modulating the speech signal 154 with one or more flicker noise signals 452, according to a first modulation parameter 454; 3) split the noisy speech signal 154 according to a user-specific user audio metadata dataset 244, generating a second set of split audio frames 456; 4) determine a difference 462 between the first set of split audio frames 444 and the second set of split audio frames 456; 5) assign a score to the difference 462; 6) in each subsequent iteration, reconfigure a modulation of the speech signal 154 with the flicker noise signals by adjusting the modulation parameters 454, based on the preceding score(s) from the preceding iteration(s), to reduce the differences 462 between the location of the flicker noise signals 452 and the split points 448, according to the first set of split audio frames 444; and 7) improve the alignment of the split points 448 in the noisy speech signal 154 with those identified in the historical context changes.

At operation 402, the audio recordings 152 are fed to the audio signal processing algorithm 168. The audio recordings 152 may include speech signal 154 of the user 102, and, optionally, speech signals 154 of other users. In some embodiments, the audio signal processing algorithm 168 and/or machine learning algorithm 160 may extract the speech signal 154 of the user 102 from other users based on the voice print 166 associated with the user 102, similar to that described in FIG. 2.

At operation 404, the audio signal processing algorithm 168 and/or machine learning algorithm 160 may extract a set of audio features 442 from the speech signal 154, where the audio features 442 may indicate a set of contexts associated with different portions of the speech signal 154. In this process, the audio signal processing algorithm 168 and/or machine learning algorithm 160 may access the global audio metadata dataset 440, which includes historical context data and historical context changes extracted from a set of speech signals associated with a set of users. In other words, the global audio metadata dataset 440 may include information about how each speech of multiple users was split contextually, such that each split is related to a respective context (e.g., context 178 (see FIG. 2)). In some embodiments, the global audio metadata dataset 440 may include a collection of contextually split audio frames 182 and corresponding split text 184 for multiple users that are determined based on the operational flow 200 described in FIG. 2. For example, the global audio metadata dataset 440 may include detailed annotations of each audio frame's contextual relevance, where each annotation specifies the linguistic, emotional, or situational context present at the time of recording. The global audio metadata dataset 440 may further include statistical models derived from these annotations, such as the probability of transition between different contexts within a conversation, and the typical duration of each context as observed across various user interactions. The set of contexts, indicated by the audio features 442, may be extracted based on the historical context data extracted from multiple speeches of multiple users included in the global audio metadata dataset 440.

Splitting the User's Speech Signal Based on Historical Context Data

The audio signal processing algorithm 168 and/or machine learning algorithm 160 may detect one or more potential context changes among different portions of the speech signal 154 based on the audio features 442 and the information from the global audio metadata dataset 440. For example, assume that the audio signal processing algorithm 168 and/or machine learning algorithm 160 detect a potential context change 446 at a split point 448 between a first audio frame 444a and a second audio frame 444b along the speech signal 154. The audio signal processing algorithm 168 and/or machine learning algorithm 160 may detect further context changes 446 at other split points 448 along the speech signal 154, based on the audio features 442 and the information from the global audio metadata dataset 440.

The audio signal processing algorithm 168 and/or machine learning algorithm 160 may split the speech signal 154 contextually, based on the detected potential context changes among the different portions of the speech signal 154, based on the audio features 442, and based on the historical context changes determined from the global audio metadata dataset 440. For example, the audio signal processing algorithm 168 and/or machine learning algorithm 160 may split the speech signal 154 into a first set of split audio frames 444 that include at least the first audio frame 444a and the second audio frame 444b separated at the split point 448 based on the detected context change 446 at the split point 448 between them. The first set of split audio frames 444 may include any number of audio frames 444, based on the number of context changes 446 between different portions of the speech signal 154.

Generating a Noisy Speech Signal and Splitting the Noisy Speech Signal According to User-Specific Speech Pattern At operation 406, the audio signal processing algorithm 168 may remove background noise signals from the speech signal 154 and perform normalization on the speech signal 154, similar to that described in FIG. 2.

At operation 408, the audio signal processing algorithm 168 may access the user-specific audio metadata dataset 244 to generate irregular frequency signals (e.g., flicker noise signals 452), for example, based on the historical user pauses and context changes indicated in the user-specific audio metadata dataset 244. The user-specific audio metadata dataset 244 may include information about the speech pattern of the particular user 102 in question. For example, the user-specific audio metadata dataset 244 may include information about the frequency and typical durations of pauses, the common inflection points, where the user 102 tends to shift in tone or topic and patterns of speech rhythm that are unique to the user 102. The user-specific audio metadata dataset 244 may include the record of specific contexts, in which the user 102 alters their speech dynamics, such as during formal presentations, casual conversations, discussing a stressful topic, discussing a relaxing topic, in response to different types of interactions or emotional states, etc. Additionally, the user-specific audio metadata dataset 244 may include annotated examples of past speech, where significant contextual transitions have occurred, to provide a reference model for identifying similar transitions in new speech data. The generated irregular frequency signals 452 may, for example, indicate signals within the speech signal 154 indicating pauses or transitions in context, according to the user-specific speech patterns in the user audio metadata dataset 244.

In response, the audio signal processing algorithm 168 may generate a noisy speech signal 450 (i.e., noise-induced speech signal 450) by modulating the speech signal 154 with one or more flicker noise signals 452, according to a first modulation parameter 454. The location of one or more flicker noise signals 452 may be determined based on the first modulation parameter 454. For example, a flicker frequency signal 452 may correspond to a frequency signal that has a frequency less than a threshold frequency 238, such as less than 100 kilo hertz (KHz), etc. The flicker noise signal 452 may indicate a pause by the user 102 within the noisy speech signal 450.

The audio signal processing algorithm 168 may split the noisy speech signal 450 into a second set of split audio frames 456, where the second set of split audio frames 456 is split at locations of the flicker noise signals 452 along the noisy speech signal 450. In the first iteration of the operational flow 400, for example, the first modulation parameter 454 may be such that the one or more flicker noise signals 452 may be modulated/added at random locations along the noisy speech signal 450. In subsequent iterations of the operational flow 400, the modulation process (e.g., the modulation parameter 454) may be adjusted based on the differences 462 between the first set of split audio frames 444 (that indicates contextually split audio frames based on the historical context changes of multiple users) and the second set of split audio frames 456 (that indicates audio splitting according to locations of the flicker noise signals 452), and the historical user speech patterns 460, such that the speech signal 154 is contextually split according to the user-specific historical user speech patterns 460.

In some embodiments, in the first iteration, the flicker noise signals 452 may be added to random locations along the noisy speech signal 450. In some embodiments, in the first iteration and/or other iterations, the flicker noise signals 452 may be added to locations along the noisy speech signal 450, where the user 102 is expected to pause (indicating a context change in speech signal 450, 154) based on historical user speech patterns 460.

At operation 410, the audio signal processing algorithm 168 and/or machine learning algorithm 160 may split the noisy speech signal 450 into the second set of split audio frames 456, where the second set of split audio frames 456 is split at the locations of the flicker noise signals 452 along the noisy speech signal 450.

Determining a Difference Between the First and Second Sets of Audio Frames

At operation 412, the second set of split audio frames 456 is fed to the audio processing software module 150. At operation 414, the audio signal processing algorithm 168 and/or the machine learning algorithm 160 may determine if there is any difference 462 between the first set of split audio frames 444 and the second set of split audio frames 456. In this process, the signal processing algorithm 168 and/or the machine learning algorithm 160 may compare the first set of split audio frames 444 with the second set of split audio frames 456. For example, in this process, the signal processing algorithm 168 and/or the machine learning algorithm 160 may compare the context changes indicated by the first set of split audio frames 444 with the context changes indicated by the second set of split audio frames 456.

The signal processing algorithm 168 and/or the machine learning algorithm 160 may determine the difference 462 between the first set of split audio frames 444 and the second set of split audio frames 456. In some embodiments, the difference 462 may indicate the differences between the context changes as indicated by the first set of split audio frames 444 and the context changes, as indicated by the second set of split audio frames 456. For example, the signal processing algorithm 168 and/or the machine learning algorithm 160 may determine that the first set of split audio frames 444 has a split point 448 (between audio frames 444a-b), which is missing from the second set of split audio frames 456, and vice versa based on the comparison between the first set of split audio frames 444 and the second set of split audio frames 456.

For example, if the location of the flicker noise signal 452 in the second set of split audio frames 456 may not have been aligned with any of the split points 448 identified in the first set of split audio frames 444. Thus, this misalignment may result in the difference 462 between the first set of split audio frames 444 and the second set of split audio frames 456, e.g., determining that the first set of split audio frames 444 has a split point 448 (between audio frames 444a-b), which is missing from the second set of split audio frames 456, or vice versa. This may be due to the noisy speech signal 450 not being split contextually, not accurately replicating the natural breaks, or context changes in the noisy speech signal 450. This discrepancy may be addressed by adjustments to the modulation parameters 454 used to modulate the flicker noise signals 452 into the speech signal 153 to place the flicker noise signals 452 closer to the places of actual context changes within the speech signal 154 in subsequent iterations, and to more closely synchronize the noise-induced split audio frames 456 with the context changes 446 observed in the contextually-split audio frames 444.

At operation 416, the first set of split audio frames 444 may be fed to the audio processing software module 150. At operation 418, the historical user speech patterns 460 may be fed to the audio processing software modules 150. The historical user speech patterns 460 may include information on the timing, frequency, and characteristics of pauses, fillers (e.g., speech fillers, such as "um", etc.), intonations, and shifts in topics as historically observed in the speech of the user 102 in the audio recordings 152. The historical user speech patterns 460 may also include annotations about specific linguistic cues or changes in language usage that correlate with different contexts or emotional states. The historical user speech patterns 460 may further include statistical models or profiles that summarize the user's speech dynamics, such as average pause durations, common phrases or words used in particular settings, phrases or patterns used for context changes, and habitual changes in speech pace or volume across different conversational scenarios.

At operation 420, information indicating the detected differences 462 between the first set of split audio frames 444 and the second set of split audio frames 456 are fed to the audio processing software module 150. The differences 462 detected between these sets of frames indicate discrepancies in how the audio has been segmented by two different processes: the contextual audio splitting, based on global audio metadata dataset 440, and the noise-induced audio splitting, based on the user-specific audio metadata 458. With this approach, the audio processing software module 150 gradually leans how the individual user 102 typically speaks, to detect more accurate context changes, interpret the user's speech signal 154, and generate more accurate responses 114 to the user 102, rather than applying a uniform model across different users.

These differences 462, between the first set of split audio frames 444 and the second set of split audio frames 456, indicate how the individual user 102's speech pattern varies from the general user dataset for the given context and situation. At operation 422, the user audio metadata dataset 244 is fed to the audio processing software module 150.

Adapting the Speech Signal Splitting Operation Based on the Detected Differences The audio processing software module 150 may use the received inputs to dynamically adapt the splitting process/rule of the speech signal 154. In this process, the audio processing software module 150 may adjust the segmentation rules to better align with the user's natural speech patterns. For example, in response to determining the difference 462 between the first set of split audio frames 444 and the second set of split audio frames 456 and based on other inputs mentioned above, the audio processing software module 150 may determine, that the second set of split audio frames 456 is not split contextually.

In response, in operation 424, the audio processing software module 150 may reconfigure the modulation of the speech signal 154 with the flicker noise signals 452, according to the differences 462, historical user's pause patterns and context change patterns (indicated in the historical user speech patterns 460), such that the locations of the flicker noise signals 452 along the noisy speech signal 450 are adjusted based on the split points 448 indicated in the first set of split audio frames 444, and/or the locations of user-specific context changes of the use 102. For example, in this operation, the modulation parameter 454 may be updated, so that the locations of the flicker noise signals 452 (after the next modulation of the speech signal 154 with the flicker noise signals 452 in the next iteration) may be moved closer to the location of the split points 448 indicated in the first set of split audio frames 444. In the same or another example, in this operation, the modulation parameter 454 may be updated, so that the locations of the flicker noise signals 452 (after the next modulation of the speech signal 154 with the flicker noise signals 452 in the next iteration) may be moved closer to the location of user-specific context changes determined from the historical user speech patterns 460.

For example, if the analysis by the audio processing software module 150 reveals, that the user 102 typically pauses longer before changing topics (compared to other users) or shows a change in context that was not captured in the initial noisy speech signal segmentation (i.e., in the second set of split audio frames 456), the audio processing software module 150 may reconfigure the modulation of the speech signal 154 with the flicker noise signals 452, so that the flicker noise signals 452 are repositioned to or within a threshold distance from these specific points.

In a subsequent iteration, the operational flow 400 returns to the operation 402. For example, in the second iteration, the audio signal processing algorithm 168 may generate a second noisy speech signal 450 by modulating the flicker noise signals 452 with the speech signal 154, according to a second modulation parameter 454, which is an updated modulation parameter 454. In the second iteration, the locations of the flicker noise signals 452 are updated, for example, the flicker noise signal 452 may be added at a second location along the speech signal 154, where the second location may be closer to the split point 448 compared to the first location of the flicker noise signal 452 in the first iteration. The audio signal processing algorithm 168 and/or the machine learning algorithm 160 may split the second noisy speech signal 154 into a third set of split audio frames 456 (different from the second set of split audio frames 456 in the first iteration), where the third set of split audio frames 456 may be split at second, updated locations of the flicker noise signals 452 along the noisy speech signal 450.

The signal processing algorithm 168 and/or the machine learning algorithm 160 may compare the third set of split audio frames 456 with the first set of split audio frames 444 and determine the differences 462 between them. For example, the signal processing algorithm 168 and/or the machine learning algorithm 160 may determine a distance between the split point 448 and each of the second, updated locations of the flicker noise signals 452. In the same or another example, the signal processing algorithm 168 and/or the machine learning algorithm 160 may determine a distance (in terms of the time difference in a time domain) between each of the second, updated locations of the flicker noise signals 452, and the locations of historical user-specific context changes, based on the historical user speech patterns 460.

In either example, if the determined distance is less than a threshold distance (i.e., less than one second time period, 0.1 second time period, etc.), the signal processing algorithm 168 and/or the machine learning algorithm 160 may perform another iteration. Otherwise, if the distance is less than the threshold distance, the signal processing algorithm 168 and/or the machine learning algorithm 160 may determine, that the third set of audio frames 456 is contextually split according to the user-specific speech patterns.

In some embodiments, the signal processing algorithm 168 and/or the machine learning algorithm 160 may determine a difference 462 between the first set of split audio frames 444 and the second set of split audio frames 456, where the difference 462 may indicate a distance (in terms of time difference in their occurrences over time) between the split point 448 and the first location of the flicker noise signal 452. In response, the signal processing algorithm 168 and/or the machine learning algorithm 160 may assign a score to the detected difference 462, where the score is proportional to the detected distance. The signal processing algorithm 168 and/or the machine learning algorithm 160 may use this score value in reinforcement learning to iteratively adjust and refine the modulation parameters 454 for modulating the flicker noise signals 452 with the speech signal 154 in subsequent iterations.

In this manner, the time difference between the detected split points 448 in the original audio frames 444 and the placement of flicker noise signals 452 in subsequent iterations of processing the speech signal 154 may be reduced. For example, generating the second noisy speech signal 154 by modulating the flicker noise signal 452 with the speech signal 154, according to the second modulation parameter 454 in the second iteration, comprises determining the second modulation parameter 454 based on the assigned score to the difference 462 in the first iteration. In some embodiments, the difference 462 may include one or more split points 448 that are missing from the second set of split audio frames 456.

In some embodiments, the signal processing algorithm 168 and/or the machine learning algorithm 160 may determine that the second set of split audio frames 456 has at least one split point that is missing from the first set of split audio frames 444 based on the comparison between them. In response, the signal processing algorithm 168 and/or the machine learning algorithm 160 may determine that the second set of split audio frames 456 is not split contextually (e.g., does not represent a contextual splitting of the speech signal 450). In response, the signal processing algorithm 168 and/or the machine learning algorithm 160 may reconfigure the modulation of the speech signal 154 with the flicker noise signal 452 using the updated modulation parameter 454 and, according to the pause pattern data and other speech pattens associated with user 102 (indicated in the historical user speech patterns 460), such that the first location of the flicker noise signal 452 along the noisy speech signal 450 is moved toward the split point 448 indicated by the first set of split audio frames 444.

In some embodiments, the signal processing algorithm 168, the machine learning algorithm 160 and/or the audio processing software module 150 may iteratively reconfigure the modulation of the speech signal 154 with the flicker noise signals 452, according to the differences 462, historical user speech patterns 460 until the second set of split audio frames 456 corresponds to the first set of split audio frames 444 and/or corresponds to the historical locations of pauses, context changes associated with the user 102 according to historical user speech patterns 460.

Method for Adaptive Audio Segmentation for Context Change Detection in Speech Signal FIG. 5 illustrates an example flowchart of a method 500 for adaptive audio segmentation for context change detection in speech signal 154, 450, according to some embodiments. Modifications, additions, or omissions may be made to method 500. Method 500 may include more, fewer, or other operations. For example, operations may be performed in parallel or in any suitable order. While at times, it is discussed that the system 100, audio processing device 140 (via the audio signal processing algorithm 168, machine learning algorithm 160, and/or audio processing software module 150), or components of any of thereof perform some operations, any suitable system or components of the system may perform one or more operations of the method 500. For example, one or more operations of method 500 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 502-526.

At operation 502, the audio signal processing algorithm 168 and/or machine learning algorithm 160 may obtain a speech signal 154 associated with the user 102, for example, by obtaining the audio recordings 152, similar to that described in FIG. 4. At operation 504, the audio signal processing algorithm 168 and/or machine learning algorithm 160 may extract a set of audio features 442 from the speech signal 154, where the set of audio features 442 indicates a set of contexts associated with different portions of the speech signal 154, similar to that described in FIGS. 2-4.

At operation 506, the audio signal processing algorithm 168 and/or machine learning algorithm 160 may detect a potential context change 446 within the speech signal 154, for example, between the first audio frame 444a and the second audio frame 444b, similar to that described in FIG. 4.

At operation 508, the audio signal processing algorithm 168 and/or machine learning algorithm 160 may split the speech signal 154 into a first set of split audio frames 444 based at least in part upon the detected potential context changes 446, similar to that described in FIG. 4.

At operation 510, the audio signal processing algorithm 168 and/or machine learning algorithm 160 may generate a noisy speech signal 450 by modulating the flicker noise signal 452 with the speech signal 154, according to a first modulation parameter 454, similar to that described in FIG. 4. This operation may be in a first iteration for the contextually splitting process of the speech signal 154, 450.

At operation 512, the audio signal processing algorithm 168 and/or machine learning algorithm 160 split the noisy (noise-indued) speech signal 450 into a second set of split audio frames 456 based, at least in part, upon the location of the flicker noise signals 452, similar to that described in FIG. 4.

At operation 514, the audio signal processing algorithm 168, machine learning algorithm 160, and/or the audio processing software module 150 may access the historical speech patterns 460 associated with the user 102. At operation 516, the audio signal processing algorithm 168 and/or machine learning algorithm 160 may compare the first set of split audio frames 444 with the second set of split audio frames 456, similar to that described in FIG. 4.

At operation 518, the audio processing device 120 (e.g., via any or any combination of the audio signal processing algorithm 168, machine learning algorithm 160, and/or the audio processing software module 150) may determine whether there is a difference 462 between the first set of split audio frames 444 and the second set of split audio frames 456, similar to that described in FIG. 4. If it is determined that there is a difference 462 between the first set of split audio frames 444 and the second set of split audio frames 456, the method 500 may proceed to operation 522. Otherwise, the method 500 may proceed to operation 520.

At operation 520, the audio processing device 120 (e.g., via any or any combination of the audio signal processing algorithm 168, machine learning algorithm 160, and/or the audio processing software module 150) may determine that the second set of split audio frames 456 is split contextually, similar to that described in FIG. 4.

At operation 522, the audio processing device 120 (e.g., via any or any combination of the audio signal processing algorithm 168, machine learning algorithm 160, and/or the audio processing software module 150) may determine that the second set of split audio frames 456 is split contextually.

At operation 524, the audio processing device 120 (e.g., via any or any combination of the audio signal processing algorithm 168, machine learning algorithm 160, and/or the audio processing software module 150) may reconfigure the modulation of the speech signal 154 with the flicker noise signal 452 according to the historical speech patterns 460 associated with the user 102, in a next iteration, similar to that described in FIG. 1. In some embodiments, the flicker noise signals 452 may be updated, for example, in terms of duration, frequency, and/or amplitude, based on the user-specific audio metadata 458 and/or the historical user speech patterns 460 in the subsequent iterations.

At operation 526, the audio processing device 120 (e.g., via any or any combination of the audio signal processing algorithm 168, machine learning algorithm 160, and/or the audio processing software module 150) may update the first modulation parameter 454 based on a score assigned to the difference 462 (e.g., proportional to the difference 462)

between the first set of split audio frames 444 and the second set of split audio frames 456.

Figure 6:
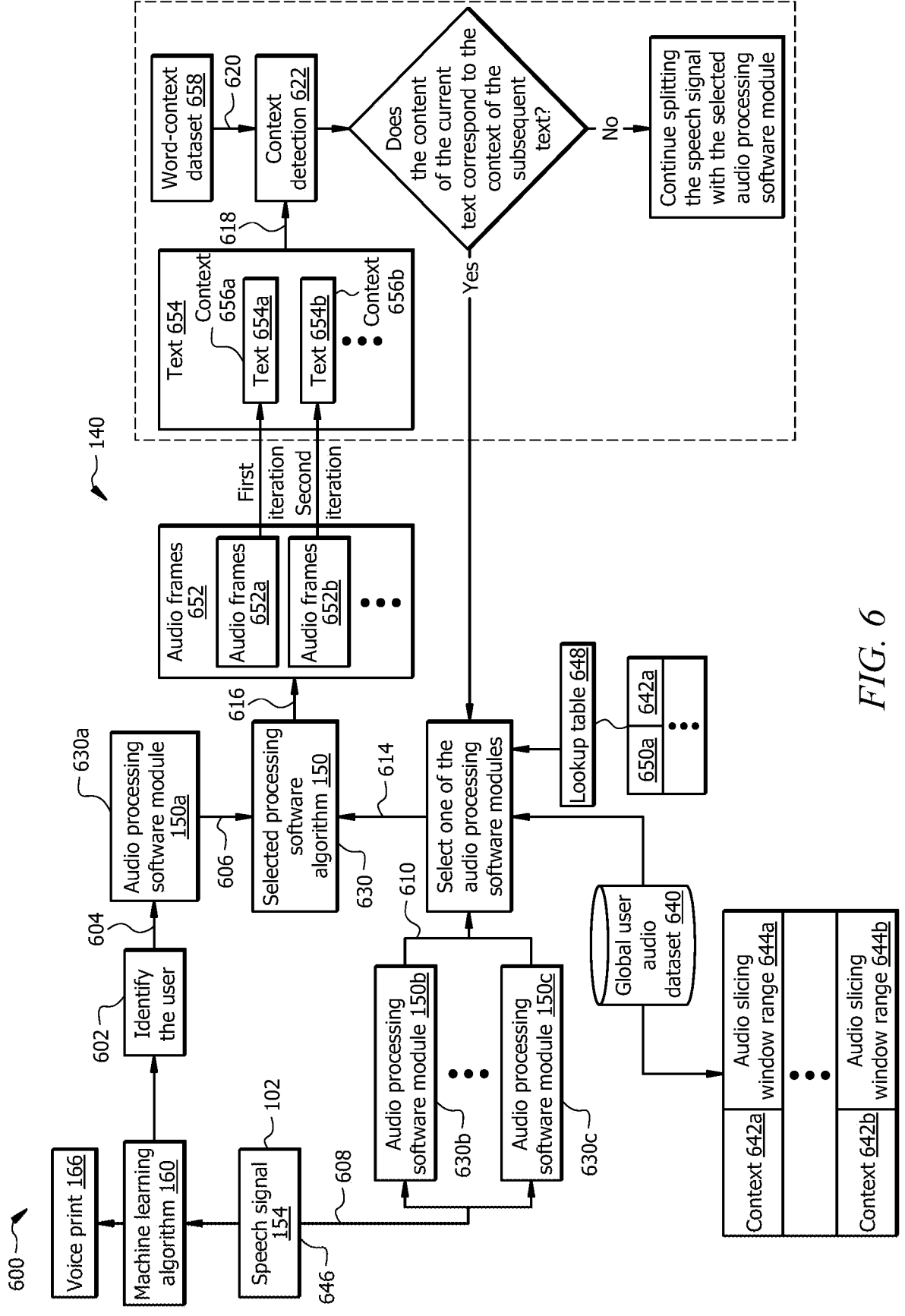
FIG. 6 illustrates an example operational flow of the system of FIG. 1 for a dynamic audio slicing window selection for contextually splitting a speech signal.

Operational Flow for a Dynamic Audio Slicing Window Selection for Contextually Splitting a Speech Signal FIG. 6 illustrates an example operational flow 600 of the system 100 (see FIG. 1) for a dynamic audio slicing window selection for contextually splitting a speech signal 154. The operational flow 600 may be executed for a current call 108 between the user 102 and an entity 232 (e.g., another person, automated voice assistant, etc.) associated with the organization 104 (see FIG. 1). In some embodiments, the operational flow 600 may be executed on calls 108 as the conversion between the user 102 and the entity 232, for example, in real-time or within an acceptable latency.

During the call 108, the slicing window for splitting the speech signal 154 of the user 102 may dynamically be updated one or more times through one or more iterations of the operational flow 600, until the speech signal 154 is split contextually for the given topic/context that the is being discussed on the call 108 and, according to the current emotion and state of mind of the user 102, that may alter the tone, speech, and a context change pattern of the user 102. In some embodiments, the operational flow 600 may be executed on audio recordings 152 that include the speech signal 154 of the user 102.

The operational flow 600 may begin at operation 602, where the user 102 is identified. In this process, the speech signal 154 may be fed to the machine learning algorithm 160 and the machine learning algorithm 160 may extract the voice print 166 associated with the user 102 (e.g., the voice print 166 (see FIG. 2)) and identify the identity of the user 102 based on the voice print 166, similar to that described in FIG. 2. In some embodiments, the speech signal 154 may go through a normalization and background noise removal, similar to that described in FIG. 2.

Identifying an Audio Processing Software Module that is Assigned to the User

At operation 604, the audio processing device 140 (e.g., via the processor 142) may identify a particular audio processing software module 150a that is assigned to the user 102. The particular audio processing software module 150a may be a user-specific audio processing software module 150a that is trained/configured to split the speech signal of the user 102 contextually, according to a particular audio slicing window 630a. For example, the audio processing software module 150a may be trained/configured to detect the context changes in the speech of the user 102 based on the operational flow 200 described in FIG. 2 and the method 300 described in FIG. 3, where the user audio metadata dataset 244, that is associated with the user 102, is used to train the audio processing software module 150a and/or based on the operational flow 400 described in FIG. 4 and the method 500 described in FIG. 5, where the current state of the user 102 is used to detect the current context changes in the user's speech.

In some embodiments, the audio slicing window 630a may correspond to the audio slicing window that generates and leads to the contextual split audio frames 182 (see FIG. 2). Thus, the audio slicing window 630a may be set/determined based on the predicted context changes among various portions of the speech signal 154 (as indicated by the differing contexts 178a-b as described in FIG. 2). In some embodiments, the audio slicing window 630a may correspond to the audio slicing window that generates and leads to the contextual split audio frames 456, 444 (see FIG. 4). Thus, the audio slicing window 630a may be set/determined based on the predicted context changes among various portions of the speech signal 154 (as indicated by the differing contexts as described in FIG. 4). In some embodiments, the audio slicing window 630a may be dynamic and include one or more audio slicing windows/time periods. In some embodiments, the audio slicing window 630a may lead to one or multiple varying time frames 652. At operation 606, the audio processing software module 150a is passed to and maintained at the next operation 616 for a selection process.

Assigning an Audio Slicing Window to Each Audio Processing Software Module

At operation 608, the audio processing device 140 may forward the speech signal 154 to one or more audio processing software modules 150 (e.g., audio processing software module 150b-c). The audio processing device 140 may determine a first audio slicing window range 644a that is associated with the context 642a by referencing the global user audio dataset 640, in response to determining an overall context 646 of the speech signal 154 corresponds to the context 642a. For example, the audio processing device 140 (e.g., via the context detection machine learning algorithm 160) may extract a set of features from the speech signal 154, where the set of features indicates the speech pattern, frequency signal information, overall context 646, topic, etc. associated with the speech signal 154.

The audio processing device 140 (e.g., via the context detection machine learning algorithm 160) may search the global user audio dataset 640 to identify the entry that is associated with the detected context 646 of the speech signal 154. In response, the audio processing device 140 (e.g., via the context detection machine learning algorithm 160) may determine the first audio slicing window range 644a that is associated with the context 642a.

For example, assume that the overall context 646 of the speech signal 154 is accessing a user profile on a website. In this example, the audio processing device 140 (e.g., via the context detection machine learning algorithm 160) may determine that the context 646 of the speech signal 154 is accessing a user profile on a website. In response, the audio processing device 140 (e.g., via the context detection machine learning algorithm 160) may search in the global user audio dataset 640 and identify the entry associated with the same context 642a as the context 646 of the speech signal 154. In response, the audio slicing window range 644a may be determined. The audio slicing window range 644a may include a set of audio slicing windows 630, such as 1 second, 1.4 seconds, 2.5 seconds, etc.

The audio slicing window range 644a may be determined based on historical audio recordings within which the context 642a is discussed/uttered by one or more users. Similarly, the audio slicing window range 644b may be determined based on historical audio recordings within which the context 642b is discussed/uttered by one or more users.

The audio processing device 140 may configure each of the audio processing software module 150b-c with one of the audio slicing windows 630 included in the audio slicing context range 644a. For example, the audio processing device 140 may configure the audio processing software module 150b with the audio slicing window 630b, and the audio processing software module 150c with the audio slicing window 630c. In response, the audio processing software module 150b may split the speech signal 154 according to the audio slicing window 630b, and the audio processing software module 150c may split the speech signal 154 according to the audio slicing window 630c.

Any number of audio processing software modules 150 may be implemented based on the number of audio slicing windows 630 included in the audio slicing window range 644a. For example, if the global user audio dataset 640 indicates that historical speech signals, where the context 642a (e.g., navigating a user profile on a website) was discussed are contextually split with a first audio slicing window 630b (e.g., 1 second) for a first user in a first circumstance (e.g., when the first user had a first emotion), a second audio slicing window 630c (e.g., 1.3 seconds) for a second user in a second circumstance (e.g., when the second user had a second emotion), these audio slicing windows 630b-c may be included in the audio slicing window range 644a and implemented on the audio processing software algorithms 150b-c, respectively to determine a more accurate audio slicing window 630 for the current circumstance (e.g., when the user 102 has a third emotion) to accurately split the speech signal 154 contextually.

Selecting One of the Audio Processing Software Modules

At operation 610, the audio processing device 140 may select one of the audio processing software algorithms 150b-c based on predicted, potential context change patterns in the current and/or historical speech signals 154 associated with the user 102. For example, the audio processing device 140 (e.g., via the machine learning algorithm 160) may predict the potential context changes within the speech signal 154. In response, use the potential context changes to select a particular, more appropriate audio slicing window 630b-c that aligns with or leads to the predicted potential context changes in the speech signal 154 (e.g., within a threshold range from a slicing window that leads to splitting the speech signal 154 based on the potential context changes), based on the current emotional state or conversational dynamics of the user 102. For example, assume that the audio processing software module 150b is selected.

At operation 614, the audio processing device 140 may select one of the audio processing software modules 150a and the audio processing software module 150b. In this process, for example, the audio processing device 140 may select one of these modules 150a-b that is associated with/ assigned with an audio slicing window 630a-b that follows/ aligns (more closely compared to the other one) with the currently predicted potential context changes within the speech signal 154, based, at least, on the information provided by the global user audio dataset 640 and the context change detection with respect to the speech signal 154. In some embodiments, the selected audio processing software module 150 may be the audio processing software module 150b. In some embodiments, the selected audio processing software module 150 may be the audio processing software module 150a.

In some embodiments, the selecting process may include accessing a lookup table 648 that comprises a set of context-slicing window entries, where the set of context-slicing window entries comprises a first entry that indicates the first context 642a is associated with a particular audio slicing window 650a. In response, the audio processing device 140 may determine which of the first audio slicing window 630a and the second audio slicing window 630b is within a threshold range (e.g., within 0.1 second time difference, 0.2 seconds time difference, etc.) from the particular audio slicing window 650a. In response, the audio processing device 140 may select one of the audio processing software modules 150a and the audio processing software module 150b, based on a first difference between the first audio slicing window 630a and the particular audio slicing window 650a, and a second difference between the second audio slicing window 630b and the particular audio slicing window 650a.

In some embodiments, the selected audio processing software module 150 (e.g., one of the modules 150a-b) may be associated with/configured with the audio slicing window 630 (e.g., one of the audio slicing windows 630a-b that corresponds to particular audio slicing window 650a. It may be determined that the selected audio slicing window 630 corresponds to the particular audio slicing window 650a in response to determining that the selected audio slicing window 630 is within a threshold range (e.g., within 0.1 second time difference, 0.2 seconds time difference, etc.) from the particular audio slicing window 650a.

Splitting the Speech Signal Using the Selected Audio Processing Software Module and Audio Slicing Window At operation 616, the selected audio processing software module 150 (e.g., one of the modules 150a-b) may be executed to split the speech signal 154. In this process, the selected audio processing software module 150 may split the speech signal 154 into a first set of audio frames 652 according to the respective audio slicing window 630, where each audio frame 652 comprises an utterance of one or more words uttered by the user 102 during the speech signal 154. The first set of audio frames 652 may include the audio frames 652a-b and/or other audio frames that are split according to the selected audio slicing window 630. The audio proceeding device 140 (e.g., via the machine learning algorithm 160) may perform the following operations for each audio frame 652.

Detecting the Context of Each Text

The machine learning algorithm 160 may convert each audio frame 652 into a respective text 654 by implementing an audio-to-text conversion neural network, similar to that described in FIG. 2. For example, in a first iteration, the first audio frame 652a is converted into a first text 654a. In response, at operation 618, the machine learning algorithm 160 may determine the context 656a associated with the first text 654a, similar to that described in FIG. 1 with respect to detecting context 164, 178 for a given text 162.

To this end, at operation 620, the machine learning algorithm 160 may access the word-context dataset 658. The word-context dataset 658 may include a set of words, where each word is associated with a corresponding context. In this process, for example, the machine learning algorithm 160 analyzes the converted text 654a to identify key words and phrases within the text 654a that indicate specific contexts. Each identified word from the text 654a is matched against the word-context dataset 658 to ascertain its associated context as indicated in the word-context dataset 658. For example, if the text 654a includes words, such as "website" and "development", which are associated with website development context 656a within the dataset 658, the machine learning algorithm 160 may classify the context 656a of this text 654a as related to website development context 656a.

Thus, in some embodiments, determining the first context 656a associated with the first text 654a based on the word-context dataset 658 comprises determining that the word-context dataset 658 includes the first text 654a (or the identified key words in the text 654a) that is associated with the first context 656a. The machine learning algorithm 160 may store and save the context 656a of the text 654a to be compared with context(s) 656 of subsequent text(s) 654. For example, in a second iteration, operations 618 and 620 may performed on the second audio frame 652b. For example, the second audio frame 652b may be converted into the second text 654b, and the context 656b of the second text 654b may be determined. In some embodiments, determining the second context 656b associated with the second text 654*b* based on the word-context dataset 658 comprises determining that the word-context dataset 658 comprises the second text 654*b* (or the identified key words in the text 654*b*) that is associated with the second context 656*b*.

Updating the Audio Slicing Window and/or Audio Processing Software Module

At context detection operation 622, the audio processing device 140 (e.g., via the machine learning algorithm 160) may compare the first context 656*a* with the second context 656*b* to determine whether the first context 656*a* corresponds to the second context 656*b*. In this operation, the audio processing device 140 (e.g., via the machine learning algorithm 160) may generate a context vector for each context 656 and compare the context vectors associated with the contexts 656*a* and 656*b*. For example, each context vector may include numerical values that represent various features of the given context 656, such as the frequency and type of keywords identified in the respective text 654, tone, speech pattern, and other linguistic features that are indicative of the given context 656. The machine learning algorithm 160 may determine a distance between a first context vector associated with the first context 656*a* and a second context vector associated with the second context 656*b* in the vector space. If the determined distance is less than a threshold distance (e.g., less than 0.1, 0.2, etc.), the machine learning algorithm 160 may determine that the second context vector corresponds to the first context vector, and thus, the second context 656*a* corresponds to the first context 656*a*.

If it is determined that the first context 656*a* does not correspond to the second context 656*b*, the audio processing device 140 may continue to use the currently selected audio processing software module 150 and the selected audio slicing window 630 to continue the splitting and context detection operations on the speech signal 154, such as, analyze, split, and evaluate the rest of the audio frames 652.

If it is determined that the first context 656*a* corresponds to the second context 656*b*, the machine learning algorithm 160 may determine that the selected audio slicing window 630 is anomalous, i.e., does not lead to contextually splitting the speech signal 154, and at least two of the audio frames 652*a-b* are not split contextually, and the splitting process has not led to detecting a context change within the speech signal 154 and between the audio frames 652*a* and 652*b*. In other words, determining that the selected audio slicing window 630 is anomalous comprises determining that the selected audio slicing window 630 does not lead to contextually split audio frames 652 with respect to the context 646 of the speech signal 154 and the speech signal 154 associated with the user 102. If it is determined that the first context 656*a* corresponds to the second context 656*b*, the audio processing device 140 may return to the selection operation 610.

In some embodiments, the audio processing device 140 may update the selected audio slicing window 630. For example, updating the selected audio slicing window 630 may include reducing or increasing the selected audio slicing window 630. In some embodiments, the selected audio slicing window 630 may be updated, such that it more closely aligns with predicted, potential context changes within the speech signal 154, e.g., becomes within a threshold range from the split points resulting in the predicted, potential context changes within the speech signal 154.

In some embodiments, the selected audio slicing window 630 may be updated, such that it more closely aligns with context changes according to historical user context change patterns associated with the user 102, e.g., based on a comparison with the lookup table 648 and/or the global user audio dataset 640.

In some embodiments, the audio processing device 140 may reconfigure the selected audio processing software module 150 with the updated audio slicing window 630. In response, the audio processing device 140 may perform/repeat the operations 616-622 using the reconfigured audio processing software module 150.

In some embodiments, the audio processing device 140 may select another audio processing software module 150 that is assigned with an audio slicing window 630 that is more closely aligned with context changes according to historical user context change patterns associated with the user 102, e.g., based on a comparison with the lookup table 648 and/or the global user audio dataset 640.

The audio processing device 140 may perform the context detection operations on the speech signal 154 by taking at least the reconfigured audio processing software module 150 into account. For example, the audio processing device 140 may perform the operations 616-622 to split the speech signal 154 into an updated set of audio frames 652, convert each audio frame 652 into a respective text 654, determine a context 656 of each text 654, and determine whether the context 656*a* of the current text 654*a* corresponds to the context 656*b* of the subsequent text 654*b*.

The audio processing device 140 may perform one or more operations of the operational flow 600 iteratively in one or more iterations until the speech signal 154 is split contextually. For example, the audio processing device 140 may reconfigure the audio processing software module 150*b* with the updated audio slicing window 630*b*. In response, in the second iteration, the audio processing device 140 may select one of the reconfigured audio processing software modules 150*b* and the audio processing software module 150*a*. The selected module 150*a* or 150*b* may be associated with the audio slicing window 630*a* or 630*b* (respectively) that is more closely aligned with the currently predicted potential context changes within the speech signal 154 based, at least, on the information provided by the global user audio dataset 640 and the context change detection with respect to the speech signal 154 compared to the other one.

In some embodiments, the selected audio processing software module 150 may be the reconfigured audio processing software module 150*b*. In some embodiments, the selected audio processing software module 150 may be the audio processing software module 150*a*.

The audio processing device 140 may split, using the selected audio processing software module 150 (e.g., one of the reconfigured audio processing software modules 150*b* and the audio processing software module 150*a*) the speech signal 154 into a second set of audio frames 652. The audio processing device 140 may convert a third audio frame 652*a*, from among the second set of audio frames 652, into a third text 654*a*, and determine a third context 656*a* of the third text 654*a* based at least on the word-context dataset 658, similar to that described above. The audio processing device 140 may convert a fourth audio frame 652*b*, from among the second set of audio frames 652, into a fourth text 654*b*, and determine a fourth context 656*b* of the fourth text 654*b* based on the word-context dataset 658, similar to that described above.

The audio processing device 140 may compare the third context 656*a* with the fourth context 656*b* and determine whether they differ from each other. For example, if the audio processing device 140 determines that the third context 656*a* differs from the fourth context 656*b*, the audio processing device 140 may determine that the two audio frames 652a and 652b are split contextually and there is a context change between them. In response, the audio processing device 140 may proceed to evaluating subsequent audio frames 652 using the currently selected audio processing software module 150 and the associated audio slicing window 630. For example, the audio processing device 140 may continue the splitting and context detection operations of the rest of the second set of audio frames 652.

The audio processing device 140 may iteratively evaluate each audio frame 652 versus one or more subsequent audio frames 652 to determine whether they are contextually split. In response, the audio processing device 140 may update the audio slicing window 630, update/reconfigure the audio processing software module 150, select another audio slicing window 630, and select another audio processing software module 150, until it is determined that the speech signal 154 is being split contextually.

For example, in a next iteration, the audio processing device 140 may split the speech signal 154 into a third set of audio frames 652 using the reconfigured audio processing software module 150b: convert a fifth audio frame 652a, from among the third set of audio frames 652, into a fifth text 654a; determine a fifth context 656a associated with the fifth text 654a based on the word-context dataset 658; convert a sixth audio frame 652a, from among the third set of audio frames 652, into a sixth text 654a; determine a sixth context 656b associated with the sixth text 654b based on the word-context dataset 658; compare the fifth context 656a with the sixth context 655b; determine whether the fifth context 656a differs from the sixth context 656b. In response to determining that the fifth context 656a differs from the sixth context 656b, the audio processing device 140 may continue the splitting and context detection of the rest of the third set of audio frames 652, using the currently selected audio processing software module 150 and the associated audio slicing window 630. In some embodiments, identifying the audio processing software module 150a is in response to identifying the identity of the user 102.

Method for Adaptive Audio Slicing Window Selection for Contextually Splitting a Speech Signal FIG. 7 illustrates an example flowchart of a method 700 for adaptive audio slicing window selection for contextually splitting a speech signal 154, according to some embodiments. Modifications, additions, or omissions may be made to method 700. Method 700 may include more, fewer, or other operations. For example, operations may be performed in parallel or in any suitable order. While at times, it is discussed that the system 100, audio processing device 140 (via the audio signal processing algorithm 168, machine learning algorithm 160, and/or audio processing software module 150), or components of any of thereof perform some operations, any suitable system or components of the system may perform one or more operations of the method 700. For example, one or more operations of method 700 may be implemented, at least in part, in the form of software instructions 148 of FIG. 1, stored on a tangible non-transitory machine-readable medium (e.g., memory 146 of FIG. 1) that, when run by one or more processors (e.g., processor 142 of FIG. 1), may cause the one or more processors to perform operations 702-736.

At operation 702, the audio processing device 140 obtains the speech signal 154 that comprises a speech of a user 102 about a first context 646, similar to that described in FIG. 6. At operation 704, the audio processing device 140 extracts a voice print 166 associated with the user 102 from the speech signal 154. For example, the audio processing device

140 may implement the machine learning algorithm 160 to extract the voice print 166 from the speech signal 154, similar to that described in FIGS. 2 and 6. The audio processing device 140 may identify the user 102 based on the voice print 166.

At operation 706, the audio processing device 140 identifies the first audio processing module 150a that is assigned to the user 102 based, at least, on the voice print 166 associated with the user 102. For example, the audio processing device 140 may identify the first audio processing module 150a based on the identity of the user 102 determined based on the voice print 166, similar to that described in FIG. 6.

At operation 708, the audio processing device 140 determines a first audio slicing window range 644a associated with the first context 642a (which corresponds to the context 646) by referencing a global user audio dataset 640, similar to that described in FIG. 6.

At operation 710, the audio processing device 140 configures each of a set of audio processing software modules 150b-c with an audio slicing window 630b-c within the first audio slicing window range 644a, respectively, similar to that described in FIG. 6.

At operation 712, the audio processing device 140 selects a second audio processing software module 150b-c, from among the set of audio processing software module s 150b-c, where the second audio processing software module 150b-c is configured with a second audio processing window 630b-c, similar to that described in FIG. 6.

At operation 714, the audio processing device 140 selects one of the first set of audio processing software module 150a and the second audio processing software module 150b-c based at least on an audio slicing window-context lookup table 648, similar to that described in FIG. 6.

At operation 716, the audio processing device 140 splits, using the selected audio slicing software module 150, the speech signal 154 into a first set of audio frames 652 comprising a first audio frame 652a and a second audio frame 652b.

At operation 718, the audio processing device 140 converts the first audio frame 652a into a first text 654a, similar to that described in FIG. 6. At operation 720, the audio processing device 140 determines a first context 656a associated with the first text 654a, similar to that described in FIG. 6.

At operation 722, the audio processing device 140 selects a subsequent audio frame 652 from among the first set of audio frames 652. For example, in a second iteration/loop, the audio processing device 140 may select the second audio frame 652b, in a third iteration/loop, the audio processing device 140 may select a third audio frame 652, and so on.

At operation 724, the audio processing device 140 converts the subsequent audio frame 652b into text 654 (in the second iteration/loop), similar to that described in FIG. 6. At operation 726, the audio processing device 140 determines context 656b associated with the text 654b. At operation 728, the audio processing device 140 determines whether the context 656a of the current text 654a corresponds to the context 656b of the subsequent text 654b, similar to that described in FIG. 6. If it is determined that the context 656a corresponds to the context 656b, the method 700 proceeds to operation 732. Otherwise, the method 700 proceeds to operation 730.

At operation 730, the audio processing device 140 continues splitting the speech signal 154 with the selected audio processing software module 150 and slicing window 630.

At operation 732, the audio processing device 140 determines that the selected audio slicing window 630 (any of the audio slicing windows 630a, b, or *c*) is anomalous.

At operation 734, the audio processing device 140 updated the selected audio slicing window 630, similar to that described in FIG. 6.

At operation 736, the audio processing device 140 reconfigures the selected audio processing software module 150 with the updated audio slicing window 630, similar to that described in FIG. 6. In some embodiments, the audio processing device 140 may select another audio processing software module 150, similar to that described in FIG. 6.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system for adaptive audio segmentation for context change detection in speech, comprising:
    a memory configured to store an audio recording of a speech signal associated with a user; and
    a processor, operably coupled to the memory, and configured to:
        extract, by a context detection machine learning algorithm, a set of audio features from the speech signal, wherein the set of audio features indicates a set of contexts associated with different portions of the speech signal, wherein the set of contexts is extracted based, at least in part, upon a set of historical context data extracted from a set of speeches associated with a set of users;
        detect a potential context change between a first audio frame and a second audio frame within the speech signal based at least in part upon the set of contexts, wherein the potential context change is at a split point between the first audio frame and the second audio frame;
        split the speech signal into a first set of split audio frames, wherein the first set of split audio frames is contextually split based, at least in part, upon the detected potential context change;

generate a noisy speech signal by modulating at least one flicker noise signal with the speech signal according to a first modulation parameter, wherein:
            the at least one flicker noise signal corresponds to a frequency signal that has a frequency less than a threshold frequency; and
            according to the first modulation parameter, the at least one flicker noise signal is added to a first location along the speech signal in a first iteration;
        split the noisy speech signal into a second set of split audio frames, wherein the second set of split audio frames is split at the first location of the at least one flicker noise signal along the noisy speech signal;
        access a historical speech pattern associated with the user;
        compare the second set of split audio frames with the first set of split audio frames;
        determine that the first set of split audio frames has at least the split point that is missing from the second set of split audio frames based at least in part upon the comparison;
        in response to determining that the second set of split audio frames has at least the split point that is missing from the first set of split audio frames:
            determine that the second set of split audio frames is not split contextually; and
            reconfigure, according to the historical speech pattern associated with the user, a modulation of the speech signal with the at least one flicker noise signal such that the first location of the at least one flicker noise signal along the noisy speech signal is moved toward the split point indicated by the first set of split audio frames.

2. The system of claim 1, wherein the processor is further configured to, in a second iteration:
    generate a second noisy speech signal by modulating the at least one flicker noise signal with the speech signal according to a second modulation parameter, wherein:
        in the second iteration, the at least one flicker noise signal is added to a second location along the speech signal;
        the second location is closer to the split point compared to the first location;
    split the second noisy speech signal into a third set of split audio frames, wherein the third set of split audio frames is split at the second location of the at least one flicker noise signal along the second noisy speech signal;
    compare the third set of split audio frames with the first set of split audio frames;
    determine a distance between the split point and the second location of the at least one flicker noise signal;
    determine that the distance is less than a threshold distance;
    in response to determining that the distance is less than the threshold distance, determine that the third set of split audio frames is split contextually.

3. The system of claim 1, wherein the processor is further configured to:
    detect a difference between the second set of split audio frames and the first set of split audio frames, wherein the difference indicates a distance between the split point and the first location of the at least one flicker noise signal; and
    assign a score to the detected difference, wherein the score is proportional to the detected distance.

4. The system of claim 3, wherein generating the second noisy speech signal by modulating the at least one flicker noise signal with the speech signal, according to the second modulation parameter, comprises determining the second modulation parameter based, at least in part, upon the assigned score.

5. The system of claim 3, wherein the difference comprises at least the split point that is missing from the second set of split audio frames.

6. The system of claim 1, wherein the processor is further configured to:

determine that the second set of split audio frames has at least one split point that is missing from the first set of split audio frames based, at least in part, upon the comparison;

in response to determining that the second set of split audio frames has at least one split point that is missing from the first set of split audio frames:

determine that the second set of split audio frames is not split contextually; and reconfigure, according to the historical speech pattern associated with the user, a modulation of the speech signal with the at least one flicker noise signal, such that the first location of the at least one flicker noise signal along the noisy speech signal is moved toward the split point indicated by the first set of split audio frames.

7. The system of claim 1, wherein the processor is further configured to iteratively reconfigure, according to the historical speech pattern associated with the user, the modulation of the speech signal with the at least one flicker noise signal until the second set of split audio frames corresponds with the first set of split audio frames.

8. A method for adaptive audio segmentation for context change detection in speech, comprising:

storing an audio recording of a speech signal associated with a user;

extracting, by a context detection machine learning algorithm, a set of audio features from the speech signal, wherein the set of audio features indicates a set of contexts associated with different portions of the speech signal, wherein the set of contexts is extracted based, at least in part, upon a set of historical context data extracted from a set of speeches associated with a set of users;

detecting a potential context change between a first audio frame and a second audio frame within the speech signal based, at least in part, upon the set of contexts, wherein the potential context change is at a split point between the first audio frame and the second audio frame;

splitting the speech signal into a first set of split audio frames, wherein the first set of split audio frames is contextually split based, at least in part, upon the detected potential context change;

generating a noisy speech signal by modulating at least one flicker noise signal with the speech signal according to a first modulation parameter, wherein:

the at least one flicker noise signal corresponds to a frequency signal that has a frequency less than a threshold frequency; and according to the first modulation parameter, the at least one flicker noise signal is added to a first location along the speech signal in a first iteration;

splitting the noisy speech signal into a second set of split audio frames, wherein the second set of split audio frames is split at the first location of the at least one flicker noise signal along the noisy speech signal;

accessing a historical speech pattern associated with the user;

comparing the second set of split audio frames with the first set of split audio frames;

determining that the first set of split audio frames has at least the split point that is missing from the second set of split audio frames based, at least in part, upon the comparison;

in response to determining that the second set of split audio frames has at least the split point that is missing from the first set of split audio frames:

determining that the second set of split audio frames is not split contextually; and reconfiguring, according to the historical speech pattern associated with the user, a modulation of the speech signal with the at least one flicker noise signal, such that the first location of the at least one flicker noise signal along the noisy speech signal is moved toward the split point indicated by the first set of split audio frames.

9. The method of claim 8, further comprising, in a second iteration:

generating a second noisy speech signal by modulating the at least one flicker noise signal with the speech signal according to a second modulation parameter, wherein:

in the second iteration, the at least one flicker noise signal is added to a second location along the speech signal;

the second location is closer to the split point compared to the first location;

splitting the second noisy speech signal into a third set of split audio frames, where in the third set of split audio frames is split at the second location of the at least one flicker noise signal along the second noisy speech signal;

comparing the third set of split audio frames with the first set of split audio frames;

determining a distance between the split point and the second location of the at least one flicker noise signal;

determining that the distance is less than a threshold distance;

in response to determining that the distance is less than the threshold distance, determining that the third set of split audio frames is split contextually.

10. The method of claim 8, further comprising:

detecting a difference between the second set of split audio frames and the first set of split audio frames, wherein the difference indicates a distance between the split point and the first location of the at least one flicker noise signal; and assigning a score to the detected difference, wherein the score is proportional to the detected distance.

11. The method of claim 10, wherein generating the second noisy speech signal by modulating the at least one flicker noise signal with the speech signal according to the second modulation parameter comprises determining the second modulation parameter based, at least in part, upon the assigned score.

12. The method of claim 10, wherein the difference comprises at least the split point that is missing from the second set of split audio frames.

13. The method of claim 8, further comprising:

determining that the second set of split audio frames has at least one split point that is missing from the first set of split audio frames based at least in part upon the comparison;

in response to determining that the second set of split audio frames has at least one split point that is missing from the first set of split audio frames:

determining that the second set of split audio frames is not split contextually; and reconfiguring, according to the historical speech pattern associated with the user, a modulation of the speech signal with the at least one flicker noise signal, such that the first location of the at least one flicker noise signal along the noisy speech signal is moved toward the split point indicated by the first set of split audio frames.

14. The method of claim 8, further comprising iteratively reconfiguring, according to the historical speech pattern associated with the user, the modulation of the speech signal with the at least one flicker noise signal until the second set of split audio frames corresponds with the first set of split audio frames.

15. A non-transitory computer-readable medium storing instructions that, when executed by a processor, cause the processor to:

store an audio recording of a speech signal associated with a user;

extract, by a context detection machine learning algorithm, a set of audio features from the speech signal, wherein the set of audio features indicates a set of contexts associated with different portions of the speech signal, wherein the set of contexts is extracted based, at least in part, upon a set of historical context data extracted from a set of speeches associated with a set of users;

detect a potential context change between a first audio frame and a second audio frame within the speech signal based at least in part upon the set of contexts, wherein the potential context change is at a split point between the first audio frame and the second audio frame;

split the speech signal into a first set of split audio frames, wherein the first set of split audio frames is contextually split based, at least in part, upon the detected potential context change;

generate a noisy speech signal by modulating at least one flicker noise signal with the speech signal according to a first modulation parameter, wherein:

the at least one flicker noise signal corresponds to a frequency signal that has a frequency less than a threshold frequency; and according to the first modulation parameter, the at least one flicker noise signal is added to a first location along the speech signal in a first iteration;

split the noisy speech signal into a second set of split audio frames, wherein the second set of split audio frames is split at the first location of the at least one flicker noise signal along the noisy speech signal;

access a historical speech pattern associated with the user;

compare the second set of split audio frames with the first set of split audio frames;

determine that the first set of split audio frames has at least the split point that is missing from the second set of split audio frames based at least in part upon the comparison;

in response to determining that the second set of split audio frames has at least the split point that is missing from the first set of split audio frames:

determine that the second set of split audio frames is not split contextually; and

reconfigure, according to the historical speech pattern associated with the user, a modulation of the speech signal with the at least one flicker noise signal, such that the first location of the at least one flicker noise signal along the noisy speech signal is moved toward the split point indicated by the first set of split audio frames.

16. The non-transitory computer-readable medium of claim 15, wherein the instructions further cause the processor to, in a second iteration:

generate a second noisy speech signal by modulating the at least one flicker noise signal with the speech signal according to a second modulation parameter, wherein:

in the second iteration, the at least one flicker noise signal is added to a second location along the speech signal;

the second location is closer to the split point compared to the first location;

split the second noisy speech signal into a third set of split audio frames, wherein the third set of split audio frames is split at the second location of the at least one flicker noise signal along the second noisy speech signal;

compare the third set of split audio frames with the first set of split audio frames;

determine a distance between the split point and the second location of the at least one flicker noise signal;

determine that the distance is less than a threshold distance;

in response to determining that the distance is less than the threshold distance, determine that the third set of split audio frames is split contextually.

17. The non-transitory computer-readable medium of claim 15, wherein the instructions further cause the processor to:

detect a difference between the second set of split audio frames and the first set of split audio frames, wherein the difference indicates a distance between the split point and the first location of the at least one flicker noise signal; and assign a score to the detected difference, wherein the score is proportional to the detected distance.

18. The non-transitory computer-readable medium of claim 17, wherein generating the second noisy speech signal by modulating the at least one flicker noise signal with the speech signal according to the second modulation parameter comprises determining the second modulation parameter based at least in part upon the assigned score.

19. The non-transitory computer-readable medium of claim 17, wherein the difference comprises at least the split point that is missing from the second set of split audio frames.

20. The non-transitory computer-readable medium of claim 15, wherein the instructions further cause the processor to:

determine that the second set of split audio frames has at least one split point that is missing from the first set of split audio frames based, at least in part, upon the comparison;

in response to determining that the second set of split audio frames has at least one split point that is missing from the first set of split audio frames:

determine that the second set of split audio frames is not split contextually; and reconfigure, according to the historical speech pattern associated with the user, a modulation of the speech signal with the at least one flicker noise signal, such that the first location of the at least one flicker noise signal along the noisy speech signal is moved toward the split point indicated by the first set of split audio frames.

\* \* \* \* \*